United States Patent
Indyk et al.

(10) Patent No.: US 10,748,157 B1
(45) Date of Patent: Aug. 18, 2020

(54) METHOD AND SYSTEM FOR DETERMINING LEVELS OF SEARCH SOPHISTICATION FOR USERS OF A CUSTOMER SELF-HELP SYSTEM TO PERSONALIZE A CONTENT SEARCH USER EXPERIENCE PROVIDED TO THE USERS AND TO INCREASE A LIKELIHOOD OF USER SATISFACTION WITH THE SEARCH EXPERIENCE

(71) Applicant: Intuit Inc., Mountain View, CA (US)

(72) Inventors: Benjamin Indyk, San Diego, CA (US); Igor A. Podgorny, San Diego, CA (US); Irene F. Ma, Carlsbad, CA (US); Matthew Cannon, San Diego, CA (US)

(73) Assignee: Intuit Inc., Mountain View, CA (US)

(*) Notice: Subject to any disclaimer, the term of this patent is extended or adjusted under 35 U.S.C. 154(b) by 684 days.

(21) Appl. No.: 15/404,944

(22) Filed: Jan. 12, 2017

(51) Int. Cl.
*G06F 17/30* (2006.01)
*G06Q 30/00* (2012.01)
(Continued)

(52) U.S. Cl.
CPC ....... *G06Q 30/016* (2013.01); *G06F 16/9535* (2019.01); *G06F 16/9566* (2019.01); *G06Q 40/00* (2013.01)

(58) Field of Classification Search
CPC .. G06Q 30/016; G06Q 40/00; G06F 16/9566; G06F 16/9535
(Continued)

(56) References Cited

U.S. PATENT DOCUMENTS 5,471,382 A 11/1995 Tallman et al.
5,519,608 A 5/1996 Kupiec
(Continued)

FOREIGN PATENT DOCUMENTS

AU 2001259223 B2 11/2001
CN 101520802 4/2009
(Continued)

OTHER PUBLICATIONS

Dror, et al., "From Query to Question in One Click: Suggesting Synthetic Questions to Searchers," International World Wide Web Conferences Steering Committee, May 13, 2013, pp. 391-401.
(Continued)

*Primary Examiner* — Isaac M Woo
(74) *Attorney, Agent, or Firm* — Paradice and Li LLP

(57) ABSTRACT

Disclosed methods and systems determine levels of search sophistication for users of a customer self-help system to personalize a content search user experience provided to the users, to increase a likelihood of users' satisfaction with the search experience. The customer self-help system analyzes submitted search queries and provides an advanced content search user experience to users who are determined to have an advanced level of search sophistication and provides a simplified content search user experience to users who are determined to have a basic or less-experienced level of search sophistication. Providing users with personalized content search user experiences that are based on users' levels of search sophistication allows less-experienced users to feel comfortable searching and allows advanced users to search more quickly or precisely.

30 Claims, 6 Drawing Sheets

(51) Int. Cl.
  *G06Q 40/00* (2012.01)
  *G06F 16/9535* (2019.01)
  *G06F 16/955* (2019.01)

(58) Field of Classification Search
  USPC .................................................. 707/600–899
  See application file for complete search history.

(56) References Cited

U.S. PATENT DOCUMENTS

| | | | |
|---|---|---|---|
| 5,701,399 A | 12/1997 | Lee et al. | |
| 6,006,218 A | 12/1999 | Breese et al. | |
| 6,147,975 A | 11/2000 | Bowman-Amuah | |
| 6,256,633 B1 | 7/2001 | Dharap | |
| 6,349,307 B1 | 2/2002 | Chen | |
| 6,513,036 B2 | 1/2003 | Fruensgaard et al. | |
| 6,564,213 B1 | 5/2003 | Ortega et al. | |
| 6,601,055 B1 | 7/2003 | Roberts | |
| 6,708,172 B1 | 3/2004 | Wong et al. | |
| 6,853,982 B2 | 2/2005 | Smith et al. | |
| 7,013,263 B1 | 3/2006 | Isaka et al. | |
| 7,222,078 B2 | 5/2007 | Abelow | |
| 7,385,716 B1 | 6/2008 | Skaanning | |
| 7,565,312 B1 | 7/2009 | Shaw et al. | |
| 7,587,387 B2 | 9/2009 | Hogue | |
| 7,594,176 B1 | 9/2009 | English | |
| 7,603,301 B1 | 10/2009 | Regan | |
| 7,610,226 B1 | 10/2009 | Miller | |
| 7,627,504 B2 | 12/2009 | Brady et al. | |
| 7,685,144 B1 | 3/2010 | Katragadda | |
| 7,739,286 B2 | 6/2010 | Sethy et al. | |
| 7,747,601 B2 | 6/2010 | Cooper et al. | |
| 7,966,282 B2 | 6/2011 | Pinckney et al. | |
| 7,974,860 B1 | 7/2011 | Travis | |
| 8,010,545 B2 | 8/2011 | Stefik et al. | |
| 8,019,753 B2 | 9/2011 | Podgorny et al. | |
| 8,200,527 B1 | 6/2012 | Thompson et al. | |
| 8,209,333 B2 | 6/2012 | Hubbard et al. | |
| 8,311,792 B1 | 11/2012 | Podgorny et al. | |
| 8,311,863 B1 | 11/2012 | Kemp | |
| 8,341,167 B1 | 12/2012 | Podgorny et al. | |
| 8,473,339 B1 | 6/2013 | McKennon et al. | |
| 8,478,780 B2 | 7/2013 | Cooper et al. | |
| 8,484,228 B2 | 7/2013 | Bhattacharyya et al. | |
| 8,631,006 B1 | 1/2014 | Haveliwala et al. | |
| 8,645,298 B2 | 2/2014 | Hennig et al. | |
| 8,660,849 B2 | 2/2014 | Gruber et al. | |
| 8,732,222 B2 | 5/2014 | Horvitz et al. | |
| 8,805,734 B2 | 8/2014 | Diana et al. | |
| 8,817,968 B1 | 8/2014 | Boutcher et al. | |
| 8,850,490 B1 | 9/2014 | Thomas et al. | |
| 8,892,539 B2 | 11/2014 | Anand et al. | |
| 8,909,568 B1 | 12/2014 | Mann et al. | |
| 8,935,192 B1 | 1/2015 | Ventilla et al. | |
| 8,943,145 B1 | 1/2015 | Peters et al. | |
| 8,983,977 B2 | 3/2015 | Ishikawa et al. | |
| 9,015,031 B2 | 4/2015 | Ferrucci et al. | |
| 9,037,578 B2 | 5/2015 | Brust et al. | |
| 9,060,062 B1 | 6/2015 | Madahar et al. | |
| 9,063,983 B1 | 6/2015 | Lee | |
| 9,229,974 B1 | 1/2016 | Lee et al. | |
| 9,235,626 B2 | 1/2016 | Liu et al. | |
| 9,247,066 B1 | 1/2016 | Stec et al. | |
| 9,336,211 B1 | 5/2016 | Bousquet et al. | |
| 9,336,269 B1 | 5/2016 | Smith et al. | |
| 9,342,608 B2 | 5/2016 | Cook et al. | |
| 9,460,191 B1 | 10/2016 | Gaucher et al. | |
| 9,471,883 B2 | 10/2016 | Chatterjee et al. | |
| 9,582,757 B1 | 2/2017 | Holmes et al. | |
| 9,633,309 B2 | 4/2017 | Giffels et al. | |
| 9,767,169 B1 | 9/2017 | Paff et al. | |
| 9,779,388 B1 | 10/2017 | Hansen et al. | |
| 9,887,887 B2 | 2/2018 | Hunter et al. | |
| 9,892,367 B2 | 2/2018 | Guo et al. | |
| 9,910,886 B2 | 3/2018 | Adams, Jr. et al. | |
| 10,002,177 B1 | 6/2018 | McClintock et al. | |
| 10,049,664 B1 | 8/2018 | Indyk et al. | |
| 10,083,213 B1 | 9/2018 | Podgorny et al. | |
| 10,134,050 B1 | 11/2018 | Hung et al. | |
| 10,147,037 B1 | 12/2018 | Podgorny et al. | |
| 10,162,734 B1 | 12/2018 | Podgorny et al. | |
| 10,210,244 B1 | 2/2019 | Branavan et al. | |
| 10,354,182 B2 | 7/2019 | Chang et al. | |
| 10,460,398 B1 | 10/2019 | Gielow et al. | |
| 10,475,044 B1 | 11/2019 | Cannon et al. | |
| 10,552,843 B1 | 2/2020 | Podgorny et al. | |
| 10,579,625 B2 | 3/2020 | Cho et al. | |
| 2002/0087387 A1 | 7/2002 | Calver et al. | |
| 2002/0111888 A1 | 8/2002 | Stanley et al. | |
| 2002/0111926 A1 | 8/2002 | Bebie | |
| 2002/0123983 A1 | 9/2002 | Riley et al. | |
| 2002/0169595 A1 | 11/2002 | Agichtein et al. | |
| 2003/0028448 A1 | 2/2003 | Joseph et al. | |
| 2003/0061131 A1 | 3/2003 | Parkan | |
| 2003/0099924 A1 | 5/2003 | Tsuboi et al. | |
| 2003/0101161 A1 | 5/2003 | Ferguson et al. | |
| 2003/0144873 A1 | 7/2003 | Keshel | |
| 2004/0024739 A1 | 2/2004 | Copperman et al. | |
| 2004/0064442 A1 | 4/2004 | Popovitch | |
| 2005/0086290 A1 | 4/2005 | Joyce et al. | |
| 2005/0114327 A1 | 5/2005 | Kumamoto et al. | |
| 2005/0137939 A1 | 6/2005 | Calabria et al. | |
| 2005/0246314 A1 | 11/2005 | Eder | |
| 2006/0064322 A1 | 3/2006 | Mascarenhas et al. | |
| 2006/0074788 A1 | 4/2006 | Grizack et al. | |
| 2006/0085255 A1 | 4/2006 | Hastings et al. | |
| 2006/0085750 A1 | 4/2006 | Easton et al. | |
| 2006/0253578 A1 | 11/2006 | Dixon et al. | |
| 2006/0265232 A1 | 11/2006 | Katariya et al. | |
| 2007/0011131 A1 | 1/2007 | Delefevre | |
| 2007/0192166 A1 | 8/2007 | Van Luchene | |
| 2007/0192168 A1 | 8/2007 | Van Luchene | |
| 2007/0192179 A1 | 8/2007 | Van Luchene | |
| 2007/0219863 A1 | 9/2007 | Park et al. | |
| 2007/0244900 A1 | 10/2007 | Hopkins et al. | |
| 2007/0259325 A1 | 11/2007 | Clapper | |
| 2007/0291739 A1 | 12/2007 | Sullivan et al. | |
| 2007/0294195 A1 | 12/2007 | Curry et al. | |
| 2008/0189197 A1 | 8/2008 | Allanson et al. | |
| 2008/0201413 A1 | 8/2008 | Sullivan et al. | |
| 2008/0208610 A1 | 8/2008 | Thomas et al. | |
| 2008/0215541 A1 | 9/2008 | Li et al. | |
| 2008/0248815 A1 | 10/2008 | Busch | |
| 2008/0294637 A1 | 11/2008 | Liu | |
| 2009/0012926 A1 | 1/2009 | Ishikawa et al. | |
| 2009/0077047 A1 | 3/2009 | Cooper et al. | |
| 2009/0089286 A1 | 4/2009 | Kumar et al. | |
| 2009/0119575 A1 | 5/2009 | Velusamy | |
| 2009/0158143 A1 | 6/2009 | Arav | |
| 2009/0162824 A1 | 6/2009 | Heck | |
| 2009/0198667 A1 | 8/2009 | Groeneveld et al. | |
| 2009/0248659 A1 | 10/2009 | McCool et al. | |
| 2009/0253112 A1 | 10/2009 | Cao et al. | |
| 2009/0259642 A1 | 10/2009 | Cao et al. | |
| 2009/0265340 A1 | 10/2009 | Barcklay et al. | |
| 2009/0292609 A1 | 11/2009 | Vaidyanathan | |
| 2010/0068687 A1 | 3/2010 | Bertelsen | |
| 2010/0070554 A1 | 3/2010 | Richardson et al. | |
| 2010/0076847 A1 | 3/2010 | Heller | |
| 2010/0076998 A1 | 3/2010 | Podgorny et al. | |
| 2010/0088262 A1 | 4/2010 | Visel et al. | |
| 2010/0138451 A1 | 6/2010 | Henkin et al. | |
| 2010/0185630 A1 | 7/2010 | Cheng et al. | |
| 2010/0191686 A1 | 7/2010 | Wang et al. | |
| 2010/0203492 A1 | 8/2010 | Nibe et al. | |
| 2010/0205180 A1 | 8/2010 | Cooper et al. | |
| 2010/0205550 A1 | 8/2010 | Chen et al. | |
| 2010/0228744 A1 | 9/2010 | Craswell et al. | |
| 2010/0235361 A1 | 9/2010 | Chandran et al. | |
| 2010/0241971 A1 | 9/2010 | Zuber | |
| 2010/0318919 A1 | 12/2010 | Murphy et al. | |
| 2011/0055110 A1 | 3/2011 | Kolyvanov et al. | |
| 2011/0055699 A1 | 3/2011 | Li et al. | |
| 2011/0071997 A1 | 3/2011 | Sullivan et al. | |
| 2011/0106895 A1 | 5/2011 | Ventilla et al. | |

(56) References Cited

U.S. PATENT DOCUMENTS

| | | |
|---|---|---|
| 2011/0125734 A1 | 5/2011 | Duboue et al. |
| 2011/0202472 A1 | 8/2011 | Wan et al. |
| 2011/0231347 A1 | 9/2011 | Xu et al. |
| 2011/0246334 A1 | 10/2011 | Schoenberg et al. |
| 2011/0264569 A1 | 10/2011 | Houseworth et al. |
| 2011/0282892 A1 | 11/2011 | Castellani et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |
| 2012/0030079 A1 | 2/2012 | Slater et al. |
| 2012/0077178 A1 | 3/2012 | Bagchi et al. |
| 2012/0084120 A1 | 4/2012 | Hirsch et al. |
| 2012/0084185 A1 | 4/2012 | Ciaramitaro et al. |
| 2012/0084279 A1 | 4/2012 | Driscoll et al. |
| 2012/0084293 A1 | 4/2012 | Brown et al. |
| 2012/0095976 A1 | 4/2012 | Hebenthal et al. |
| 2012/0101965 A1 | 4/2012 | Hennig et al. |
| 2012/0130910 A1 | 5/2012 | Al-Alami |
| 2012/0130978 A1 | 5/2012 | Li et al. |
| 2012/0136764 A1 | 5/2012 | Miller et al. |
| 2012/0150861 A1 | 6/2012 | Thione et al. |
| 2012/0166438 A1 | 6/2012 | Wu et al. |
| 2012/0219142 A1 | 8/2012 | Gould |
| 2012/0221557 A1 | 8/2012 | Edmonds et al. |
| 2012/0233191 A1 | 9/2012 | Ramanujam |
| 2012/0331052 A1 | 12/2012 | Rathod |
| 2013/0019286 A1 | 1/2013 | Barborak et al. |
| 2013/0024290 A1 | 1/2013 | Berg et al. |
| 2013/0054497 A1 | 2/2013 | Garland et al. |
| 2013/0066693 A1 | 3/2013 | Laird-McConnell et al. |
| 2013/0073387 A1 | 3/2013 | Heath |
| 2013/0073390 A1 | 3/2013 | Konig et al. |
| 2013/0103493 A1 | 4/2013 | Gao et al. |
| 2013/0110671 A1 | 5/2013 | Gray |
| 2013/0110823 A1 | 5/2013 | Su et al. |
| 2013/0111323 A1 | 5/2013 | Taghaddos et al. |
| 2013/0117677 A1 | 5/2013 | St. Jacques, Jr. |
| 2013/0204876 A1 | 8/2013 | Szucs et al. |
| 2013/0224713 A1 | 8/2013 | Ajmera et al. |
| 2013/0268319 A1 | 10/2013 | Palombo |
| 2013/0275408 A1 | 10/2013 | Rodriguez et al. |
| 2013/0282363 A1 | 10/2013 | Fan et al. |
| 2013/0285855 A1 | 10/2013 | Dupray et al. |
| 2013/0297545 A1 | 11/2013 | Bierner et al. |
| 2013/0297553 A1 | 11/2013 | Bierner |
| 2013/0297625 A1 | 11/2013 | Bierner et al. |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0022328 A1 | 1/2014 | Gechter et al. |
| 2014/0052496 A1 | 2/2014 | Diana et al. |
| 2014/0052606 A1 | 2/2014 | Vasudevan et al. |
| 2014/0075004 A1 | 3/2014 | Van Dusen et al. |
| 2014/0088944 A1 | 3/2014 | Natarajan et al. |
| 2014/0114822 A1 | 4/2014 | Sharma et al. |
| 2014/0119531 A1 | 5/2014 | Tuchman et al. |
| 2014/0172883 A1 | 6/2014 | Clark et al. |
| 2014/0181652 A1 | 6/2014 | Stanke et al. |
| 2014/0189829 A1 | 7/2014 | McLachlan et al. |
| 2014/0195613 A1 | 7/2014 | Ogilvie |
| 2014/0201045 A1 | 7/2014 | Pai et al. |
| 2014/0222669 A1 | 8/2014 | Novak et al. |
| 2014/0244528 A1 | 8/2014 | Zhang et al. |
| 2014/0280055 A1 | 9/2014 | Chang et al. |
| 2014/0280070 A1 | 9/2014 | George et al. |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0006344 A1 | 1/2015 | Saimani et al. |
| 2015/0052087 A1 | 2/2015 | Srinivasan et al. |
| 2015/0058380 A1 | 2/2015 | Polonsky et al. |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0170049 A1 | 6/2015 | Mann et al. |
| 2015/0213021 A1 | 7/2015 | He et al. |
| 2015/0229531 A1 | 8/2015 | O'Sullivan et al. |
| 2015/0242906 A1 | 8/2015 | Liu et al. |
| 2015/0254785 A1 | 9/2015 | Yang et al. |
| 2015/0317197 A1 | 11/2015 | Blair |
| 2015/0324367 A1 | 11/2015 | Aravamudan et al. |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0078567 A1 | 3/2016 | Goldman et al. |
| 2016/0103833 A1 | 4/2016 | Sanders et al. |
| 2016/0148222 A1 | 5/2016 | Davar et al. |
| 2016/0148321 A1 | 5/2016 | Ciaramitaro et al. |
| 2016/0154856 A1 | 6/2016 | Olof-Ors et al. |
| 2016/0179816 A1 | 6/2016 | Glover |
| 2016/0180470 A1 | 6/2016 | Mascaro et al. |
| 2016/0189029 A1 | 6/2016 | Giffels et al. |
| 2016/0196497 A1 | 7/2016 | Allen et al. |
| 2016/0203523 A1* | 7/2016 | Spasojevic ......... G06Q 30/0269 705/14.66 |
| 2016/0217472 A1 | 7/2016 | Podgorny et al. |
| 2016/0283491 A1 | 9/2016 | Lu et al. |
| 2016/0306846 A1 | 10/2016 | Adams, Jr. et al. |
| 2016/0371276 A1 | 12/2016 | Furtado et al. |
| 2017/0011352 A1 | 1/2017 | Jones-McFadden et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0046623 A1 | 2/2017 | Murdock et al. |
| 2017/0053026 A1 | 2/2017 | Musuluri et al. |
| 2017/0124184 A1 | 5/2017 | Podgorny et al. |
| 2017/0228459 A1 | 8/2017 | Wang et al. |
| 2017/0262529 A1 | 9/2017 | Chim et al. |
| 2017/0262900 A1 | 9/2017 | Ramachandran et al. |
| 2017/0270159 A1 | 9/2017 | Wang et al. |
| 2017/0308613 A1 | 10/2017 | Zhu et al. |
| 2017/0323233 A1 | 11/2017 | Bencke et al. |
| 2018/0032523 A1 | 2/2018 | Singhal et al. |
| 2018/0032607 A1 | 2/2018 | Singhal et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2018/0137203 A1 | 5/2018 | Hennekey et al. |
| 2018/0189292 A1 | 7/2018 | Grace, Jr. et al. |
| 2018/0287968 A1 | 10/2018 | Koukoumidis et al. |
| 2018/0321951 A1 | 11/2018 | Fitzgerald et al. |
| 2019/0018692 A1 | 1/2019 | Indyk et al. |
| 2019/0018899 A1 | 1/2019 | Podgorny et al. |
| 2019/0065576 A1 | 2/2019 | Peng et al. |
| 2019/0103035 A1 | 4/2019 | Belier et al. |
| 2020/0027095 A1 | 1/2020 | Cannon et al. |
| 2020/0134635 A1 | 4/2020 | Podgorny et al. |
| 2020/0134738 A1 | 4/2020 | Goodyear et al. |

FOREIGN PATENT DOCUMENTS

| | | |
|---|---|---|
| EP | 2159715 | 3/2010 |
| JP | 2014112316 | 6/2014 |
| WO | 2001082202 A2 | 11/2001 |
| WO | WO 2011/053830 | 5/2011 |

OTHER PUBLICATIONS

Podgorny, et al., "Content Quality and User Ranking in TurboTax AnswerXchange," Proceedings of the European Conference on Social Media, University of Brighton UK, Jul. 10-11, 2014.

Blei, David M., et al. "Latent Dirichlet Allocation;" Journal of Machine Learning Research 3, Jan. 2003, pp. 993-1022.

(56) References Cited

OTHER PUBLICATIONS

Steyvers, Mark, et al. "Probabilistic Author-Topic Models for Information Discovery;" KDD'04, Aug. 22-25, 2004.

Mimno, David, et al., "Sparse Stochastic Inference for Latent Dirichlet Allocation," Proceedings of the 29th International Conference on Machine Learning, Edinburgh, Scotland, UK, 2012.

Blei, David M., "Probabilistic Topic Models," Communications of the ACM, Apr. 2012, vol. 55, No. 4, pp. 77-84.

Grant, Sheryl, et al., "The Human Face of Crowdsourcing: A Citizen-led Crowdsourcing Case Study;" 2013 IEEE International Conference on Big Data, Silicon Valley, CA, 2013, pp. 21-24.

Encyclopedia Britannica, "Graphical User Interface (GUI);" Sep. 5, 2015. Retrieved from the internet <URL: https://www.britannica.com/technology/graphical-user-interface>.

Wikipedia, "Widget (GUI)," Sep. 7, 2016. Retrieved from the internet <URL: https://en.wikipedia.org/w/index.php?title=Widget_(GUI)&oldid=738206274>.

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the 33rd Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Bartolome et al., "Processing Unstructured Voice of Customer Feedback for Improving Content Rankings in Customer Support Systems," U.S. Appl. No. 15/094,653, filed Apr. 8, 2016.

Fitchett et al., "An Empirical Characterisation of File Retrieval," Oct. 3, 2014, University of Canterbury, Christchurch, New Zealand, Int. J. Human-Computer Studies 74 (2015), pp. 1-13 (Year: 2014).

Han et al., "Understanding and Supporting Cross-Device Web Search for Exploratory Tasks with Mobile Touch Interactions," Apr. 2015, ACM Transactions on information System, vol. 33, No. 4, pp. 1-35, (Year: 2015).

Kumar et al., "Personalized Web search Using Browsing History and Domain Knowledge" International Conference on Issues and Challenges in Intelligent Computing Techniques (ICICT), IEEE 2014, pp. 493-497.

Wen et al., "Clustering user Queries of a Search Engine," Proceedings of the 10th International Conference on World Wide Web, pp. 162-168, ACM, 2001 (Year: 2001).

Google Search, "Access Customer Support Content System User Value Analysis Experience Portion Option," 2-pages, retrieved from the internet on Jun. 15, 2020.

IEEE Xplore Search Results, "Access Customer Support Content System User Value Analysis Experience Portion Option," 3-pages, retrieved from the internet on Jun. 15, 2020.

\* cited by examiner

USER EXPERIENCE PAGE 150

METHOD AND SYSTEM FOR DETERMINING LEVELS OF SEARCH SOPHISTICATION FOR USERS OF A CUSTOMER SELF-HELP SYSTEM TO PERSONALIZE A CONTENT SEARCH USER EXPERIENCE PROVIDED TO THE USERS AND TO INCREASE A LIKELIHOOD OF USER SATISFACTION WITH THE SEARCH EXPERIENCE

BACKGROUND

A customer self-help system is a system that supports or accompanies one or more other data management systems by helping users of the one or more other data management systems find answers to their questions, without involving live customer support personnel. If a customer self-help system adequately helps a user find a satisfactory answer to the user's question, the user is less likely to seek additional support from live customer support (e.g., telephone support, live chat, text message, etc.). A business benefit of a well-functioning customer self-help system is reduced overhead costs for a company because providing live customer support can be expensive (e.g., sometimes costing the company as much as $25 per use of the live customer support). A user benefit of a well-functioning customer self-help system is that users can find answers to their questions more quickly than having to wait for live customer support because use of live customer support usually involves waiting in a queue for a turn to communicate with a customer support representative.

The quality of a customer self-help system is determined, at least in part, by how well the customer self-help system assists users in finding the customer support content for which the users are searching. To assist users in finding customer support content, traditional customer self-help systems typically apply a one-size-fits-all approach to the content search user experience that is provided to the users of the customer self-help system.

However, this traditional one-size-fits-all approach is problematic because it does not satisfy the searching needs or capabilities of users who have different levels of ability to formulate search queries. In other words, some users are very comfortable using advanced search features to formulate and submit a search query in a customer self-help system, while other users experience stress or confusion when presented with advanced search features to formulate a search query. If all users, including both advanced users and less experienced users are provided with the same content search user experience, neither category or type of user is likely to be satisfied with their search experience within the customer self-help system. For example, if an advanced user is provided with fewer content search user experience options and only a simplified content search user experience, it may take the advanced user more searches to find the results that the advanced user is searching for. Having to perform multiple searches and unnecessarily wasting time performing multiple searches, when a single search might do, can lead to a frustrated advanced user. If a less-experienced (e.g., normal) user is provided with an advanced content search user experience, the less-experienced user might be intimidated by the advanced content search user experience options and default towards seeking live customer support. If the less-experienced user attempts to use the advanced features and repeatedly fails to find the customer support content that the user is searching for, the less-experienced user may become dissatisfied with the search experience and incorrectly determine that the customer self-help system is incapable of satisfying the user's needs. Whenever a user of any type is dissatisfied, determines that the customer self-help system is inadequate, or seeks live customer support, the service provider of the customer self-help system is unlikely to gain or maintain that user's trust, confidence, and future business.

Consequently, a technical problem that exists for customer self-help systems is content search user experience to provide a customer self-help system that provides satisfying search experiences for the entire spectrum of users when servicing a customer base of varying levels of information searching skills.

SUMMARY

The present disclosure includes embodiments for determining levels of search sophistication for users of a customer self-help system to personalize a content search user experience for the users to adapt the user experience to the users and thereby increase a likelihood of user satisfaction with the search experience, according to one embodiment. The customer self-help system determines levels of search sophistication for users by analyzing search query data representing search queries and by analyzing clickstream data representing users' interactions with the customer self-help system or with a financial management system that is supported by the customer self-help system, according to one embodiment. The customer self-help system analyzes the search query data and the clickstream data by applying the search query data and the clickstream data to one or more analytics models, which include one or more of a predictive model and a probabilistic topic model, according to one embodiment. The customer self-help system uses the results of the analyses to determine levels of search sophistication for the users, and the customer self-help system provides a simplified content search user experience to less-experienced users and an advanced content search user experience to advanced users, according to one embodiment. Thus, the present disclosure resolves the above technical problem with a technical solution that includes determining the level of search sophistication of users and providing personalized content search user experiences to the users, based on the determined users' levels of search sophistication. As a result, implementation of the disclosed embodiments reduces the likelihood of repeated searching, the likelihood of contacting live customer support, and the likelihood of customer dissatisfaction with the content search user experience received from the customer self-help system, according to one embodiment.

A user's search sophistication is an ability of a user to formulate a search query, according to one embodiment. Some users have a relatively high level of ability to formulate a search query by using, for example, multiple search text boxes that are combined to form a complex search query, according to one embodiment. Some users have a relatively low level of ability to formulate a search query and are more likely to complete the formulation and submission of a search query when provided with a simplified search query (e.g., a single search text box and tips for using the search text box), according to one embodiment. The level of search sophistication for a user is a level of ability of a user to formulate a search query that effectively results in the customer support content sought by the user, according to one embodiment. Examples of levels of search sophistication include, but are not limited to, basic, intermediate, and advanced, according to one embodiment.

Determining levels of search sophistication for users of a customer self-help system to personalize a content search user experience for the users and to increase a likelihood of user satisfaction with the search experience is a technical solution to a long standing technical problem of dissatisfying and inefficient content search user experiences in customer self-help systems. Therefore, the disclosed embodiments do not represent an abstract idea for at least a few reasons. First, determining levels of search sophistication for users to personalize a content search user experience for users is not an abstract idea because it is not merely an idea itself (e.g., cannot be performed mentally or using pen and paper). Indeed, some of the disclosed embodiments of determining levels of search sophistication include tracking clickstream data and using analytics models to determine search sophistication score data, which cannot be performed mentally. Second, determining levels of search sophistication for users of a customer self-help system to personalize a content search user experience for the users is not an abstract idea because it is not a fundamental economic practice (e.g., is not merely creating a contractual relationship, hedging, mitigating a settlement risk, etc.). Third, determining levels of search sophistication for users of a customer self-help system to personalize a content search user experience for the users is not an abstract idea because it is not a method of organizing human activity (e.g., managing a game of bingo). Rather, the disclosed embodiments analyze human behavior to determine characteristics of users that can be used to modify computing processes (e.g., the selection of one content search user experience over another). Fourth, although mathematics may be used to generate an analytics model, determining levels of search sophistication for users of a customer self-help system to personalize a content search user experience for the users is not simply a mathematical relationship/formula but is instead a technique for transforming search query data into personalized search experience data that is used to personalize a content search user experience for users and to increase thereby the likelihood of causing users to more quickly and efficiently finding answers to questions, without the use of live customer support, according to one embodiment.

Further, determining levels of search sophistication for users of a customer self-help system to personalize a content search user experience for the users is not an abstract idea because the disclosed techniques allow for significant improvement to the technical fields of user experience, self-help systems, customer service, and financial management systems, according to one embodiment. The present disclosure adds significantly to the field of content searching because the disclosed customer self-help system reduces the likelihood of redundant searches, reduces the likelihood of users seeking live customer support, and increases the likelihood of improving users' search experiences by providing one of a number of content search user experiences that is suited to the searching skills of the users, according to one embodiment.

As a result, embodiments of the present disclosure allow for reduced use of processor cycles, processor power, communications bandwidth, memory, and power consumption, by reducing inefficient searching as measured by the number of search queries submitted by users when searching for customer support content, according to one embodiment. Consequently, computing and communication systems implementing or providing the embodiments of the present disclosure are transformed into more operationally efficient devices and systems.

In addition to improving overall computing performance, personalizing a content search user experience for the users of a customer self-help system significantly improves the field of financial management systems, by increasing the likelihood that users will promptly resolve their own concerns with one search or better search results, so that the users continue use of the financial management system that is supported by the customer self-help system, according to one embodiment. Furthermore, by personalizing a content search user experience for the users, the disclosed embodiments help maintain or build trust and therefore loyalty in the customer self-help system and in the financial management system with which it is associated, which results in repeat customers, efficient delivery of financial services, and reduced abandonment of use of the financial management system, according to one embodiment.

Figure 1A:
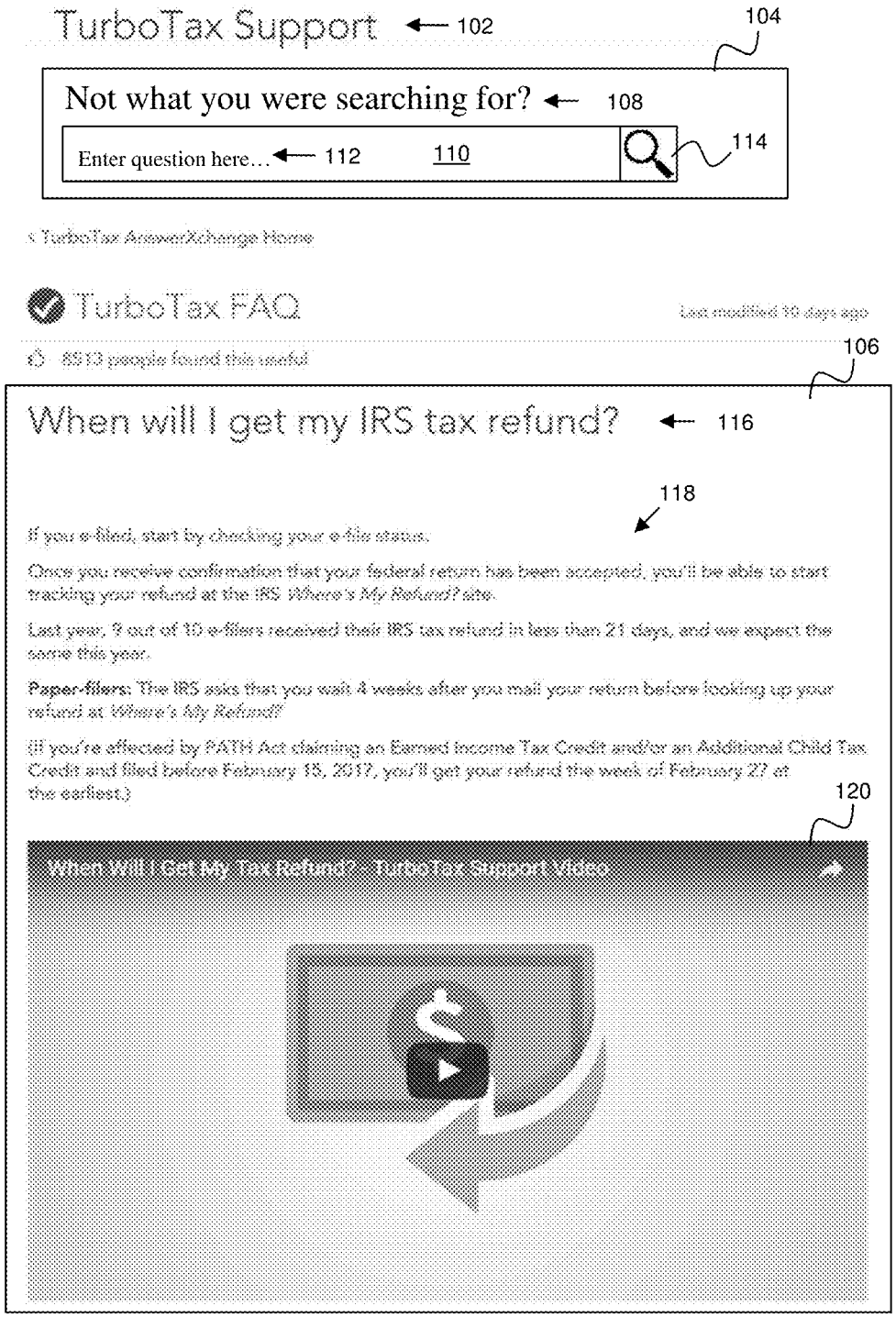
FIGS. 1A and 1B are diagrams of examples of user experience pages that are provided by a customer self-help system to personalize a content search user experience for users of the customer self-help system, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., or described below. Rather, these exemplary embodiments are provided to allow a complete disclosure that conveys the principles of the invention, as set forth in the claims, to those of skill in the art.

The INTRODUCTORY SYSTEM, USER EXPERIENCE, ARCHITECTURE, and PROCESS sections herein describe systems and processes suitable for determining levels of search sophistication for users of a customer self-help system to personalize a content search user experience for the users, according to various embodiments.

A customer self-help system improves the likelihood that users of the customer self-help system will have a satisfying search experience by providing personalized content search user experiences to the users of the customer self-help system, according to one embodiment. The customer self-help system receives search queries from users and determines the users' likely levels of ability to formulate search queries, according to one embodiment. If the users have basic or less-experienced levels of ability, then the customer self-help system provides a simplified content search user experience, which includes a single search text box with one or more tips or instructions on how to formulate a search query, according to one embodiment. If the users have advanced levels of ability, the customer self-help system provides an advanced content search user experience, which includes one or more search text boxes that provide users with the ability to define particular characteristics of their search queries, according to one embodiment. Consequently, less-experienced users are provided a user friendly content search user experience, and advanced users are provided an advanced content search user experience, so that both categories of users are more likely to have a satisfying search experience, according to one embodiment. Providing users with satisfying search experiences increases the likelihood that the users will more efficiently find answers to their questions or concerns, according to one embodiment. For users who access the features of the customer self-help system during use of a financial management system that is supported by the customer help system, providing users with a satisfying search experience increases the likelihood that the users will continue using the financial management system to complete one or more financial management tasks, according to one embodiment.

Introductory System

The present disclosure includes embodiments for determining levels of search sophistication for users of a customer self-help system to personalize a content search user experience for the users and to increase a likelihood of user satisfaction with the search experience, according to one embodiment. The customer self-help system determines levels of search sophistication for users by analyzing search query data representing search queries and by analyzing clickstream data representing users' interactions with the customer self-help system or with a financial management system that is supported by the customer self-help system, according to one embodiment. The customer self-help system analyzes the search query data and the clickstream data by applying the search query data and the clickstream data to one or more analytics models, which include one or more of a predictive model and a probabilistic topic model, according to one embodiment. The customer self-help system uses the results of the analyses to determine levels of search sophistication for the users, and the customer self-help system provides a simplified content search user experience to less-experienced users and an advanced content search user experience to advanced users, according to one embodiment. Thus, the present disclosure resolves the above technical problem with a technical solution that includes determining the level of search sophistication of users and providing personalized content search user experiences to the users, based on the determined level of user search sophistication. This reduces the likelihood of repeated searching, the likelihood of contacting live customer support, and the likelihood of customer dissatisfaction with the content search user experience received from the customer self-help system, according to one embodiment.

As used herein, the term data management system (e.g., customer self-help system, tax return preparation system, or other software system) includes, but is not limited to, the following: one or more of computing system implemented, online, web-based personal and business tax return preparation system; one or more of computing system implemented, online, web-based personal or business financial management systems, services, packages, programs, modules, or applications; one or more of computing system implemented, online, and web-based personal or business management systems, services, packages, programs, modules, or applications; one or more of computing system implemented, online, and web-based personal or business accounting or invoicing systems, services, packages, programs, modules, or applications; and various other personal or business electronic data management systems, services, packages, programs, modules, or applications, whether known at the time of filing or as developed after the time of filing.

As used herein the term "self-help system" is interchangeable with "customer self-help system," "self-service system," and "self-support system". A self-help system (e.g., a customer self-help system) is a system that enables customers and other users to help themselves find answers to questions, find specific content within a financial management system, navigate within the financial management system, or perform one or more actions (e.g., adjust the user tax data within a particular form), according to one embodiment. In contrast, the term "live customer support" denotes an interaction between a user of a financial management system and a customer support representative who uses a telephone call, instant messaging, a video conference, text messaging, or other mode of telecommunications to resolve questions or concerns of a user of the financial management system.

Specific examples of data management systems include financial management systems. Examples of financial management systems include, but are not limited to the following: TurboTax® available from Intuit®, Inc. of Mountain View, Calif.; TurboTax Online™ available from Intuit®, Inc. of Mountain View, Calif.; QuickBooks®, available from Intuit®, Inc. of Mountain View, Calif.; QuickBooks Online™, available from Intuit®, Inc. of Mountain View, Calif.; Mint®, available from Intuit®, Inc. of Mountain View, Calif.; Mint® Online, available from Intuit®, Inc. of Mountain View, Calif.; or various other systems discussed herein, or known to those of skill in the art at the time of filing, or as developed after the time of filing.

A specific illustrative example of a customer self-help system includes, but is not limited to, TurboTax AnswerXchange® available from Intuit®, Inc. of Mountain View, Calif., according to one embodiment. The TurboTax AnswerXchange® available from Intuit®, Inc. of Mountain View, Calif., is one specific example of a customer self-help system that enables users to receive responses to search queries with User Generated Content ("UGC"), service provider content (e.g., prepared by employees of Intuit®), and definitions content (e.g., explanations of tax-specific jargon), according to one embodiment.

As used herein, the terms "computing system," "computing device," and "computing entity," include, but are not limited to, the following: a server computing system; a workstation; a desktop computing system; a mobile computing system, including, but not limited to, one or more of smart phones, portable devices, and devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes or operations as described herein.

In addition, as used herein, the terms "computing system", "computing entity", and "computing environment" can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes or operations as described herein.

Herein, the term "production environment" includes the various components, or assets, used to deploy, implement, access, and use, a given system as that system is intended to be used. In various embodiments, production environments include multiple computing systems or assets that are combined, communicatively coupled, virtually or physically connected, or associated with one another, to provide the production environment implementing the application.

As specific illustrative examples, the assets making up a given production environment can include, but are not limited to, the following: one or more computing environments used to implement at least part of a system in the production environment such as a data center, a cloud computing environment, a dedicated hosting environment, or one or more other computing environments in which one or more assets used by the application in the production environment are implemented; one or more computing systems or computing entities used to implement at least part of a system in the production environment; one or more virtual assets used to implement at least part of a system in the production environment; one or more supervisory or control systems, such as hypervisors, or other monitoring and management systems used to monitor and control assets or components of the production environment; one or more communications channels for sending and receiving data used to implement at least part of a system in the production environment; one or more access control systems for limiting access to various components of the production environment, such as firewalls and gateways; one or more traffic or routing systems used to direct, control, or buffer data traffic to components of the production environment, such as routers and switches; one or more communications endpoint proxy systems used to buffer, process, or direct data traffic, such as load balancers or buffers; one or more secure communication protocols or endpoints used to encrypt/decrypt data, such as Secure Sockets Layer (SSL) protocols, used to implement at least part of a system in the production environment; one or more databases used to store data in the production environment; one or more internal or external services used to implement at least part of a system in the production environment; one or more backend systems, such as backend servers or other hardware used to process data and implement at least part of a system in the production environment; one or more modules/functions used to implement at least part of a system in the production environment; or any other assets/components making up an actual production environment in which at least part of a system is deployed, implemented, accessed, and run, e.g., operated, as discussed herein, or as known in the art at the time of filing, or as developed after the time of filing.

As used herein, the term "computing environment" includes, but is not limited to, a logical or physical grouping of connected or networked computing systems or virtual assets using the same infrastructure and systems such as, but not limited to, hardware systems, systems, and networking/communications systems. Typically, computing environments are either known, "trusted" environments or unknown, "untrusted" environments. Typically, trusted computing environments are those where the assets, infrastructure, communication and networking systems, and security systems associated with the computing systems or virtual assets making up the trusted computing environment, are either under the control of, or known to, a party.

In various embodiments, each computing environment includes allocated assets and virtual assets associated with, and controlled or used to create, deploy, or operate at least part of the system.

In various embodiments, one or more cloud computing environments are used to create, deploy, or operate at least part of the system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, as known in the art at the time of filing, or as developed after the time of filing.

In many cases, a given system or service may utilize, and interface with, multiple cloud computing environments, such as multiple VPCs, in the course of being created, deployed, or operated.

As used herein, the term "virtual asset" includes any virtualized entity or resource, or virtualized part of an actual, or "bare metal" entity. In various embodiments, the virtual assets can be, but are not limited to, the following: virtual machines, virtual servers, and instances implemented in a cloud computing environment; databases associated with a cloud computing environment, or implemented in a cloud computing environment; services associated with, or delivered through, a cloud computing environment; communications systems used with, part of, or provided through a cloud computing environment; or any other virtualized assets or sub-systems of "bare metal" physical devices such as mobile devices, remote sensors, laptops, desktops, point-of-sale devices, etc., located within a data center, within a cloud computing environment, or any other physical or logical location, as discussed herein, or as known/available in the art at the time of filing, or as developed/made available after the time of filing.

In various embodiments, any, or all, of the assets making up a given production environment discussed herein, or as known in the art at the time of filing, or as developed after the time of filing can be implemented as one or more virtual assets within one or more cloud or traditional computing environments.

In one embodiment, two or more assets, such as computing systems or virtual assets, or two or more computing environments are connected by one or more communications channels including but not limited to, Secure Sockets Layer (SSL) communications channels and various other secure communications channels, or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, or virtual assets, as discussed herein, or available or known at the time of filing, or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, or computing systems, whether available or known at the time of filing or as later developed.

As used herein, the term "user experience display" includes not only data entry and question submission user interfaces, but also other user experience features and elements provided or displayed to the user such as, but not limited to, the following: data entry fields, question quality indicators, images, backgrounds, avatars, highlighting mechanisms, icons, buttons, controls, menus and any other features that individually, or in combination, create a user experience, as discussed herein, or as known in the art at the time of filing, or as developed after the time of filing.

As used herein, the terms "user experience page" and "user experience screen" are interchangeable in meaning and represent a changeable rendering or view of content that is provided to a user in the user experience display, according to one embodiment.

As used herein, the term "user experience" includes, but is not limited to, one or more of a search query creation process, an incremental search results receipt process, a user session, interview process, interview process questioning, or interview process questioning sequence, or other user experience features provided or displayed to the user such as, but not limited to, interfaces, images, assistance resources, backgrounds, avatars, highlighting mechanisms, icons, and any other features that individually, or in combination, create a user experience, as discussed herein, or as known in the art at the time of filing, or as developed after the time of filing.

Herein, the term "party," "user," "user consumer," and "customer" are used interchangeably to denote any party or entity that interfaces with, or to whom information is provided by, the disclosed methods and systems described herein, or a legal guardian of person or entity that interfaces with, or to whom information is provided by, the disclosed methods and systems described herein, or an authorized agent of any party or person or entity that interfaces with, or to whom information is provided by, the disclosed methods and systems described herein. For instance, in various embodiments, a user can be, but is not limited to, a person, a commercial entity, an application, a service, or a computing system.

As used herein, the term "analytics model" denotes one or more individual or combined algorithms or sets of ordered relationships that describe, determine, or predict characteristics of or the performance of a datum, a data set, multiple data sets, a computing system, or multiple computing systems. Analytics models or analytical models represent collections of measured or calculated behaviors of attributes, elements, or characteristics of data or computing systems. Analytics models include probabilistic topic models and predictive models (e.g., query classifiers), which identify the likelihood of one attribute or characteristic based on one or more other attributes or characteristics.

As used herein, the term "search sophistication" denotes or represents an ability of a user to formulate a search query. Some users have a relatively high level of ability to formulate a search query by using, for example, multiple search text boxes that are combined to form a complex search query. Some users have a relatively low level of ability to formulate a search query and are more likely to complete the formulation and submission of a search query when provided with a simplified search query (e.g., a single search text box and tips for using the search text box).

As used herein a "search sophistication score" quantifies or metricizes (i.e., makes measureable) the search sophistication of a user with a numerical score. The search sophistication score is used to determine a level of search sophistication for a user by, for example, comparing the search sophistication score to one or more thresholds, according to one embodiment. The level of search sophistication for a user is a level of ability of a user to formulate a search query that effectively results in the customer support content sought by the user. Examples of levels of search sophistication include, but are not limited to, basic, intermediate, and advanced, according to one embodiment.

User Experience

Figure 1B:
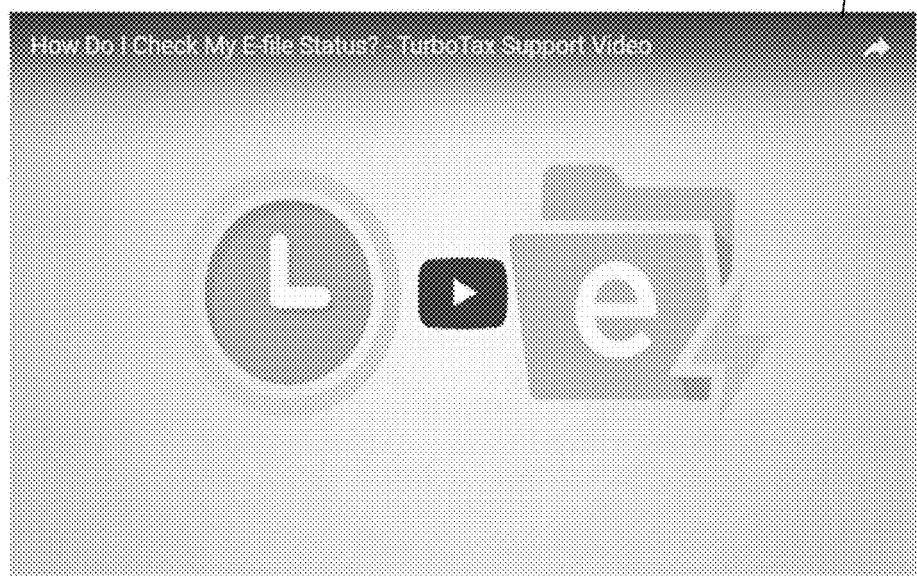

FIGS. 1A and 1B are specific illustrative examples of diagrams of a user experience page 100 (FIG. 1A) and a user experience page 150 (FIG. 1B) that are provided by a customer self-help system to users of the customer self-help system to personalize a content search user experience, to increase a likelihood of user satisfaction with the content search user experience, according to one embodiment. The customer self-help system (not shown) provides a simplified content search user experience of the user experience page 100 or an advanced content search user experience of the user experience page 150 to each of the users of the customer self-help system, based on a level of search sophistication of each user, according to one embodiment. The customer self-help system determines the level of search sophistication of a user by analyzing a search query submitted by the user and by analyzing clickstream data for the user, according to one embodiment.

Referring to FIGS. 1A and 1B, the user experience pages 100 and 150 are specific illustrative examples of user experience pages and content search user experiences that are provided by a customer self-help system, in response to a search query received for a user, according to one embodiment. The user receives a simplified content search user experience of the user experience page 100 or an advanced content search user experience of the user experience page 150, in response to submitting a search query to the customer self-help system, according to one embodiment. The user receives a simplified content search user experience of the user experience page 100 or an advanced content search user experience of the user experience page 150, in response to submitting a search query to a third-party search engine (e.g., an Internet search engine such as Google®) and selecting one of a number of Internet hyperlinks or references that are provided by the third-party search engine, according to one embodiment.

Referring to FIGS. 1A and 1B, the user experience pages 100 and 150 include a name of a customer self-help system 102, according to one embodiment. The name of a customer self-help system 102 is TurboTax AnswerXchange® available from Intuit®, Inc. of Mountain View, Calif., according to the specific illustrative examples of FIGS. 1A and 1B. The name of a customer self-help system 102 is TurboTax® Support available from Intuit®, Inc. of Mountain View, Calif., according to the specific illustrative examples of FIGS. 1A and 1B. The customer self-help system (not shown) is TurboTax AnswerXchange® available from Intuit®, Inc. of Mountain View, Calif., according to the specific illustrative examples of FIGS. 1A and 1B. The customer self-help system is configured to support TurboTax® available from Intuit®, Inc. of Mountain View, Calif., which is an example of a financial management system, according to the specific illustrative examples of FIGS. 1A and 1B. The customer self-help system is associated with and configured to support one or more financial management systems, according to one embodiment. The one or more financial management systems are provided by one or more service providers, according to one embodiment. The service provider is Intuit®, Inc. of Mountain View, Calif., according to the specific illustrative examples of FIGS. 1A and 1B.

Referring now to FIG. 1A, the user experience page 100 includes a first or simplified content search user experience 104 and requested customer support content 106, according to one embodiment. The customer self-help system provides the first or simplified content search user experience 104 to users of the customer self-help system that are identified as having have a basic or less-experienced level of search sophistication, according to one embodiment. By providing the first or simplified content search user experience 104 to users who are identified as having a basic or less-experienced level of search sophistication, the customer self-help system reduces a likelihood of confusion by the users, reduces the likelihood of repeated searches by the users, and reduces the likelihood that the users will seek live customer support assistance, according to one embodiment.

The first or simplified content search user experience 104 includes one or more of a content search user experience identifier 108, a search text box 110, search tips 112, and a search submission user experience element 114, according to various embodiments. The content search user experience identifier 108 includes "Not what you were searching for?", according to the specific illustrative example of FIG. 1A. The content search user experience identifier 108 notifies the user of the location of the first or simplified content search user experience 104 within the user experience page 100, according to one embodiment. The search text box 110 receives a search query (not shown) from a user, according to one embodiment. The search text box 110 is a simplified user experience element that enables the user to enter a search query in a format that is comfortable to the user, according to one embodiment. The search tips 112 provide assistance to users who have basic or less-experienced levels of search sophistication, to notify the users of how to use the search text box, according to one embodiment. The search tips 112 includes "Enter a question here . . . ", according to the specific illustrative example of FIG. 1A. Additional examples of search tips 112 include "Add search terms here . . . ", "Ask your question here . . . ", "How can we help you?", according various embodiments. The search submission user experience element 114 is selectable by the user to submit the search query entered into the search text box 110, according to one embodiment.

The requested customer support content 106 is provided to a user in response to the search query that was used to find the user experience page 100, according to one embodiment. The requested customer support content 106 includes, but is not limited to, one or more of User Generated Content ("UGC"), service provider content (e.g., white papers, tutorials, Frequently Asked Questions ("FAQs"), etc.), and definitions content (e.g., definitions of tax-specific jargon), according to one embodiment. The search query is "TurboTax how do I get my tax refund", according to the specific illustrative example of FIG. 1A. The requested customer support content 106 includes one or more of a representation of a search query 116, a text answer to the representation of a search query 118, and a multimedia answer to the representation of a search query 120, according to one embodiment.

The representation of a search query 116 represents a question that the customer self-help system determines to be intended by the user's search query, according to one embodiment. The representation of a search query 116 represents a question that a third-party search engine determines to be intended by the user's search query, according to one embodiment. The representation of a search query 116 is "When will I get my IRS tax refund?", according to the specific illustrative example of FIG. 1A.

The text answer to the representation of a search query 118 and a multimedia answer to the representation of a search query 120 are examples of customer support content that are provided to users by the customer self-help system to answer users questions and to resolve user concerns, according to one embodiment. The text answer to the representation of a search query 118 provides a legible response to the representation of a search query 116, according to one embodiment. The multimedia answer to the representation of a search query 120 provides a viewable or audible response to the representation of a search query 116, according to one embodiment.

Referring now to FIG. 1B, the user experience page 150 includes a second or advanced content search user experience 152 and requested customer support content 154, according to one embodiment. The customer self-help system provides the second or advanced content search user experience 152 to users of the customer self-help system that are determined to have an advanced level of search sophistication, according to one embodiment. By providing the second or advanced content search user experience 152 to users who are identified as having an advanced level of search sophistication, the customer self-help system reduces the likelihood of repeated searches by the users by enabling users to use advanced search features to search for specific content, according to one embodiment. Providing the second or advanced content search user experience 152 to users who are identified as having an advanced level of search sophistication also reduces the likelihood that the users will be dissatisfied with the search experience due to an inadequate suite of search options, according to one embodiment.

The second or advanced content search user experience 152 includes one or more of a content search user experience identifier 158, a search text box 160, a search text box 162, and a search text box 164, according to various embodiments. The second or advanced content search user experience 152 also includes one or more of a search box descriptor 166, the search box descriptor 168, a search box descriptor 170, and a search submission user experience element 172, according to various embodiments. The content search user experience identifier 158 includes "Refine search?", according to the specific illustrative example of FIG. 1B. The content search user experience identifier 158 notifies the user of the location of the second or advanced content search user experience 152 within the user experience page 150, according to one embodiment. One or more of the search text boxes 160, 162, and 164 receive a search query (not shown) from a user, according to one embodiment. The search text boxes 160, 162, and 164 are an advanced combination of user experience elements that enable a user to specify a particular, narrow, or advanced search query in a format that is within the skill or ability of the user, according to one embodiment. The search box descriptor 166 notifies the user that search query terms entered into the search text box 160 will all be included in the search query, according to one embodiment. The search box descriptor 168 notifies the user the customer self-help system will search for customer support content that excludes all of the terms that are entered into the search text box 162, according to one embodiment. The search box descriptor 170 notifies the user that the customer self-help system will search for customer support content that includes the exact phrase entered into this search text box 164, according to one embodiment. Additional or fewer search text boxes and search box descriptors can be included in the second or advanced content search user experience 152, according to various embodiments. Selection of the search submission user experience element 172, by a user, causes the search query that is formulated with the second or advanced content search user experience 152 to be submitted to the customer self-help system, according to one embodiment.

The requested customer support content 154 is provided to a user in response to the search query that was used to reference the user experience page 150, according to one embodiment. The requested customer support content 154 includes, but is not limited to, one or more of User Generated Content ("UGC"), service provider content, and definitions content, according to one embodiment. The search query is "turbotax 2016 refund status" (not shown), according to the specific illustrative example of FIG. 1B. The requested customer support content 154 includes a representation of a search query 174, a text answer to the representation of a search query 176, and a multimedia answer to the representation of a search query 178, according to one embodiment.

The representation of a search query 174 represents a question that the customer self-help system determines to be intended by the user's search query, according to one embodiment. The representation of a search query 174 represents a question that a third-party search engine determines to be intended by the user's search query, according to one embodiment. The representation of a search query 174 is "How do I check my e-file status?", according to the specific illustrative example of FIG. 1B.

The text answer to the representation of a search query 176 and a multimedia answer to the representation of a search query 178 are examples of customer support content that are provided to users by the customer self-help system to answer users' questions and to resolve users' concerns, according to one embodiment. The text answer to the representation of a search query 176 provides a legible response to the representation of a search query 174, according to one embodiment. The multimedia answer to the representation of a search query 178 provides a viewable or audible response to the representation of a search query 174, according to one embodiment.

Architecture

Figure 2:
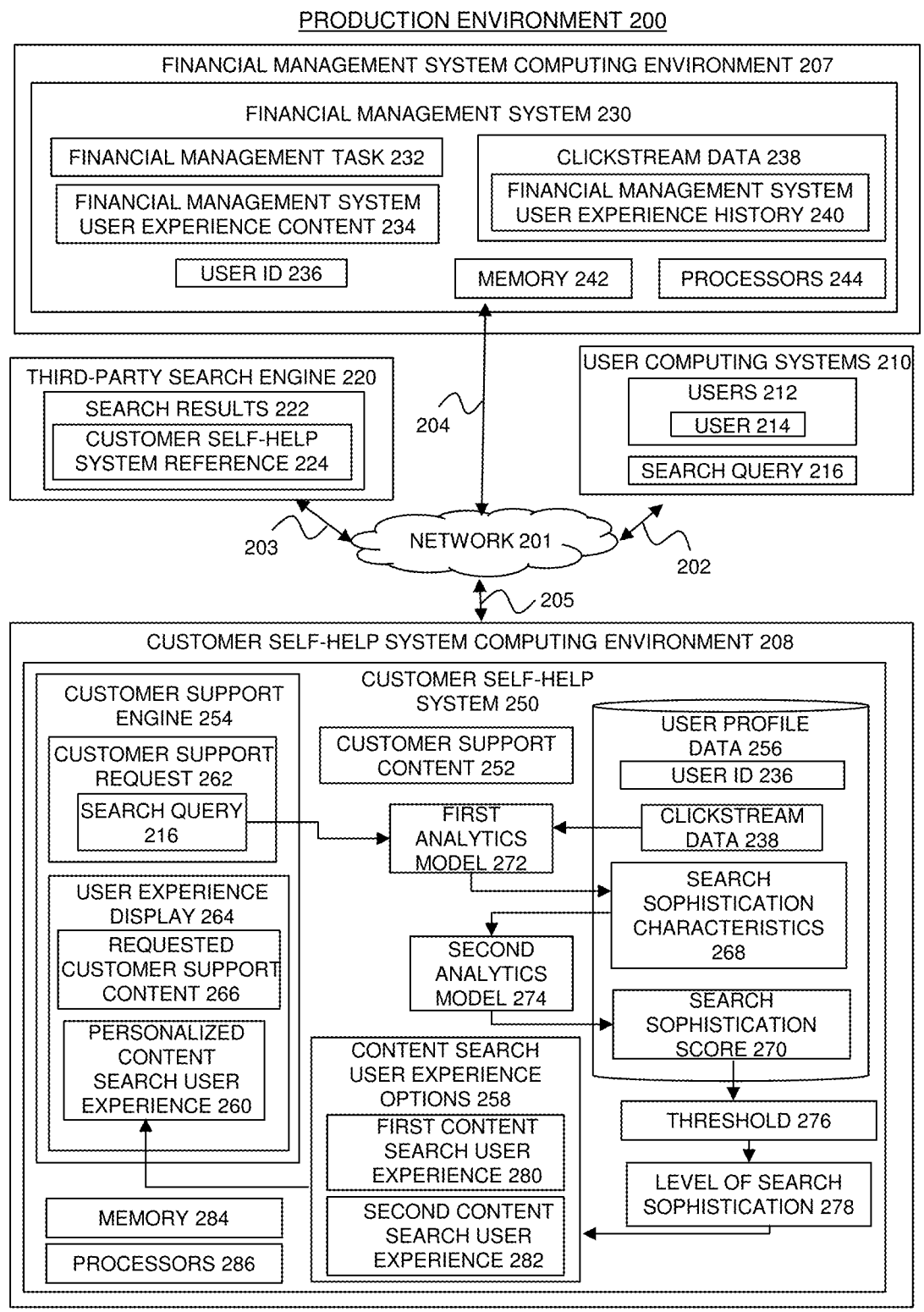
FIG. 2 is a block diagram of an architecture for determining levels of search sophistication for users of a customer self-help system to personalize a content search user experience for the users, in accordance with one embodiment.

FIG. 2 is an example block diagram of a production environment 200 for determining levels of search sophistication for users of a customer self-help system to personalize a content search user experience for the users and to increase a likelihood of user satisfaction with the search experience, according to one embodiment. The production environment 200 includes user computing systems 210, a third-party search engine 220, a financial management system 230, and a customer self-help system 250, for providing personalized content search user experiences within the customer self-help system 250 to increase a likelihood of user satisfaction with the search experience from the customer self-help system 250, according to one embodiment. According to various embodiments, the financial management system 230 is hosted in a financial management system computing environment 207, and the customer self-help system 250 is hosted in a customer self-help system computing environment 208, according to one embodiment. The financial management system computing environment 207 and the customer self-help system computing environment 208 share no computing resources, share some computing resources, or share several computing resources. The user computing systems 210, the third-party search engine 220, the financial management system 230, and the customer self-help system 250 are communicatively coupled to each other through a network 201, according to one embodiment. The network 201 represents one or more local area networks, the network 201 represents the Internet, or the network 201 represents a combination of one or more local area networks and the Internet, according to various embodiments. The user computing systems 210, the third-party search engine 220, the financial management system 230, and the customer self-help system 250 are communicatively coupled to the network 201 through communications channels 202, 203, 204, and 205, according to one embodiment.

The user computing systems 210 represent one or more user computing systems that are used by users 212 to access the third-party search engine 220, the financial management system 230, and the customer self-help system 250, according to one embodiment. A user 214 represents one of the users 212, according to one embodiment. The user 214 submits a search query 216 to the third-party search engine 220 or to the customer self-help system 250 to resolve a question or concern, to acquire more information about the financial management system 230, or to acquire information related to the financial management system 230, according to one embodiment.

The third-party search engine 220 is an example of an Internet search engine that provides search results 222 that are responsive to the search query 216, according to one embodiment. The third-party search engine 220 employs one or more content searching algorithms to identify portions of customer support content that match the search query 216 or that match an identified intent of the search query 216, according to one embodiment. Specific illustrative examples of the third-party search engine 220 include, but are not limited to, Google®, Bing®, and Yahoo®, according to various embodiments. The search results 222 include a customer self-help system reference 224, according to one embodiment. The customer self-help system reference 224 is a hyperlink or other Internet-based reference to the customer self-help system 250 or to content within the customer self-help system 250, according to one embodiment. The third-party search engine 220 provides the customer self-help system reference 224 to the user 214, in response to receiving the search query 216, according to one embodiment. The user 214 is directed to the customer self-help system 250 (e.g., though a web browser), in response to selecting the customer self-help system reference 224, according to one embodiment.

The financial management system 230 is configured to provide one or more financial management services, according to one embodiment. The financial management system 230 includes one or more of a tax return preparation system, a business financial management system, and a personal financial management system, according to one embodiment (not shown). As specific illustrative examples, the financial management system 230 includes, but is not limited to, one or more of: TurboTax® available from Intuit®, Inc. of Mountain View, Calif.; TurboTax Online™ available from Intuit®, Inc. of Mountain View, Calif.; QuickBooks®, available from Intuit®, Inc. of Mountain View, Calif.; QuickBooks Online™, available from Intuit®, Inc. of Mountain View, Calif.; Mint®, available from Intuit®, Inc. of Mountain View, Calif.; Mint® Online, available from Intuit®, Inc. of Mountain View, Calif.; and various other systems discussed herein, or known to those of skill in the art at the time of filing, or as developed after the time of filing (not shown), according to various embodiments.

The financial management system 230 assists the users 212 in completing a financial management task 232 by providing the users 212 with financial management system user experience content 234, according to one embodiment. The financial management task 232 includes, but is not limited to, one or more of preparing a tax return, filing a tax return, preparing and filing a tax return, entering financial information into the financial management system 230 to support preparing and filing a tax return, creating an account with the financial management system 230, logging into an account with the financial management system 230, creating a personal budget, setting a monetary value of a personal budget for a number of financial categories, linking one or more financial institution accounts to the financial management system 230, importing financial information into the financial management system 230 from one or more third-party servers, creating an invoice, creating a receipt, transmitting a receipt or an invoice to a supplier or to a customer, setting up a business within the financial management system 230, entering employee information, setting up payroll, paying employees through the financial management system 230, and tracking expenses, according to various embodiments.

The financial management system 230 provides the financial management system user experience content 234 with a plurality of user experience pages (not shown) to assist users in completing the financial management task 232, according to one embodiment. The financial management system user experience content 234 includes, but is not limited to, one or more tax topics, questions, question sequences, web links, content sequences, pages, colors, interface elements, promotions, audio clips, video clips, other multimedia, business questions, business budget questions, personal budget questions, data entry fields, question quality indicators, images, backgrounds, avatars, highlighting mechanisms, icons, buttons, controls, menus and any other features that individually, or in combination, create a user experience in a financial management system, as discussed herein, as known in the art at the time of filing, or as developed after the time of filing, according to various embodiments.

The financial management system user experience content 234 is provided to the users 212 to acquire user financial data (not shown) from the users 212, according to one embodiment. The financial management system 230 uses the user financial data to facilitate completion of the financial management task 232 (e.g., prepare and file a tax return) or to provide other financial management services to the users 212, according to one embodiment. The user financial data includes, but is not limited to, one or more of a user's name, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, individual retirement account ("IRA") distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, business income, accounts receivable, accounts payable, invoice information, inventory quantities, inventory costs, operating expenses, business travel records, business travel expenses, customer contact information, credit card balances, quarterly tax estimations, spending category budgets, outstanding loan balances, personal spending trends, categories of business expenses, categories of personal expenses, employee information, employee expenses, insurance costs, residential energy credits, and any other user financial data that is discussed herein, that is known at the time of filing, or that becomes known after the time of filing.

The financial management system 230 defines and stores a user identification ("ID") 236 for each of the users 212 who use the financial management system 230, according to one embodiment. The user ID 236 is at least partially based on one or more of the user computing systems 210 associated with the users 212, according to one embodiment. The user ID 236 is based on characteristics of one or more of the user computing systems 210 used to access the financial management system 230, according to one embodiment. The characteristics of the user computing systems 210 include, but are not limited to, one or more of an operating system, an Internet browser, a media access control ("MAC") address or other computer hardware identifier, an Internet Protocol ("IP") address, or any combination of the characteristics, according to one embodiment. The user ID 236 is at least partially based on one or more user characteristics provided to the financial management system 230 by the users 212 and includes, but is not limited to, a name, a username, a password, a code word, an email address, a birthdate, a government identification number, or any combination of the user characteristics, according to one embodiment. The user ID 236 is a combination of characteristics of the user computing systems 210 and of user characteristics (not shown), according to one embodiment. The user ID 236 is used by a service provider to identify a user in the financial management system 230, the customer self-help system 250, and other systems or products offered by the service provider, according to one embodiment. Defining the user ID 236 based on characteristics of one or more of the user computing systems 210 enables the financial management system 230 and the customer self-help system to identify the users 212, without the users 212 logging into an account, according to one embodiment.

The financial management system 230 records or tracks clickstream data 238 for the users 212 as they navigate and use the financial management system 230, according to one embodiment. Clickstream data 238 includes, but is not limited to, one or more selection device (e.g., mouse, stylus, finger) movements, typing speed, time spent on a user experience page, user experience elements selected with a selection device, and user experience elements that are hovered over, according to various embodiments. The clickstream data 238 includes navigation behavior data representing navigation behavior such as navigating back and forth between two or more user experience pages, which may be used to identify potential user confusion, according to one embodiment. The clickstream data 238 includes financial management system user experience history 240 as a record of the financial management system user experience content 234 that is provided to the users 212 and as a record of which user experience pages the users 212 visit within the financial management system 230, according to one embodiment.

The financial management system 230 provides the user ID 236 and the clickstream data 238 to the customer self-help system 250, to enable the customer self-help system 250 to create and maintain user profile data 256, according to one embodiment. In one embodiment, the user profile data 256 is stored in the financial management system 230 (not shown). The user profile data 256 is stored in the customer self-help system 250, in the specific illustrated example of FIG. 2. The user profile data 256 is stored in or hosted by a computing environment other than the financial management system computing environment 207 and other than the customer self-help system computing environment 208 (not shown), while remaining accessible by the financial management system 230 and the customer self-help system 250 through the network 201, according to one embodiment.

The financial management system 230 is represented or implemented by data that is partially or wholly stored in memory 242 (inclusive of non-volatile memory and volatile memory) and is partially or wholly executed by processors 244, according to one embodiment.

The production environment 200 includes a customer self-help system 250 that is associated with the financial management system 230 and that is configured to determine levels of search sophistication for the users 212 that access the customer self-help system 250 to personalize a content search user experience for the users 212, according to one embodiment. The customer self-help system 250 also provides customer support content 252 to the users 212, to resolve questions or concerns of the users 212 that are relevant to the financial management system 230, according to one embodiment. The customer self-help system 250 includes the customer support content 252, a customer support engine 254, the user profile data 256, and content search user experience options 258 for determining levels of search sophistication for the users 212 and for providing a personalized content search user experience (e.g., the first or simplified content search user experience 104 of FIG. 1A or the second or advanced content search user experience 152 of FIG. 1B) to the users 212, according to one embodiment. The customer self-help system 250 determines the level of search sophistication for the user 214 by analyzing one or more of the search query 216 and the clickstream data 238, according to one embodiment.

The customer self-help system 250 receives the search query 216 directly or indirectly from the user 214, according to one embodiment. The customer self-help system 250 receives the search query 216 directly from the user 214, if the user enters the search query 216 into one or more user experience pages of the customer self-help system 250, according to one embodiment. The customer self-help system 250 receives the search query 216 indirectly from the user 214, if the user submits the search query 216 to the third-party search engine 220, according to one embodiment. The customer self-help system 250 determines the search query 216 by using web page characteristics that are generated when the user 214 selects the customer self-help system reference 224 to be directed to the customer self-help system 250, according to one embodiment. In one specific illustrative example, if the search query 216 is "What is a like-kind exchange?" and is entered into a third-party search engine 220, then a post-search URL of Google® is "https (colon)//www(dot)google(dot)com(forward slash) webhp?sourceid=chrome-instant&ion=1&espv=2&ie=UTF-8#q=What+is+a+like-kind+exchange %3F", which includes the terms of the search query 216. The customer self-help system 250 can use one or more of a number of techniques to parse the search query 216 from the URL of the user experience page from which the user is navigated to the customer self-help system 250, as known in the art, according to one embodiment.

In response to receiving the search query 216, the customer self-help system 250 provides portions of the customer support content 252 to the user 214, according to one embodiment. The customer self-help system 250 employs one or more of a number of search engines or database search techniques to identify portions of the customer support content 252 that match or that are responsive to the search query 216, according to one embodiment. Examples of the customer support content 252 include one or more of crowd-sourced customer support content, service provider content, and definitions content, according to one embodiment. The crowd-sourced customer support content includes questions and responses that are submitted by a community of question askers and response providers that use the customer self-help system 250 or another question and answer customer support system that is associated with the financial management system 230, according to one embodiment. The crowd-sourced customer support content can also be referred to as User Generated Content ("UGC") to distinguish the crowd-sourced customer support content from the service provider content, according to one embodiment. The service provider content includes white papers, questions, answers, frequently asked questions, answers to frequently asked questions, tutorials, audio/video content, interactive content, or other content that can be used to assist users in learning about taxes, tax preparation, financial business management, personal financial management, the financial management system 230, or other relevant subject matter, according to one embodiment. The definitions content includes acronym definitions, definitions of tax-specific terms (e.g., tax jargon), definitions of terms that are related to tax law or preparing tax returns, definitions of business-specific terms, definitions of terms that are related to financial business management, and definitions of terms that are related to the financial management system 230, according to one embodiment.

The customer self-help system 250 uses the customer support engine 254 to identify the search query 216 and to provide a personalized content search user experience 260 to the user 214, according to one embodiment. The customer support engine 254 includes a customer support request 262 and a user experience display 264, according to one embodiment. The customer support request 262 represents a request from one of the user computing systems 210 that is associated with user 214, and represents a request by the user 214 to display a portion of the customer support content 252, according to one embodiment.

The customer support engine 254 uses the user experience display 264 to provide the personalized content search user experience 260 and to display requested customer support content 266, according to one embodiment. Specific illustrative examples of the user experience display 264 include the user experience page 100 of FIG. 1A and the user experience page 150 of FIG. 1B, according to one embodiment. The customer support engine 254 uses the user experience display 264 to concurrently provide the personalized content search user experience 260 and the requested customer support content 266 in a user experience page that can be read by the user 214 on one of the user computing systems 210, according to one embodiment. Specific illustrative examples of the personalized content search user experience 260 include the first or simplified content search user experience 104 of FIG. 1A and the second or advanced content search user experience 152 of FIG. 1B, according to one embodiment. The requested customer support content 266 is the portion of the customer support content 252 that is requested by the user 214, according to one embodiment. The customer support engine 254 or the customer self-help system 250 populates the personalized content search user experience 260 from a number of available content search user experiences, at least partially based on one or more of the search query 216 and the user profile data 256, according to one embodiment. In one embodiment, the customer self-help system 250 transforms data representing the user experience display 264 into data representing the first or simplified content search user experience 104 of FIG. 1A or into data representing the second or advanced content search user experience 152 of FIG. 1B.

The user profile data 256 includes the user ID 236, the clickstream data 238, search sophistication characteristics 268, and a search sophistication score 270, according to one embodiment. The clickstream data 238 represents user interactions with the financial management system 230, according to one embodiment. The clickstream data 238 is also updated by the customer self-help system 250, based on user interactions with the customer self-help system 250, according to one embodiment. The search sophistication characteristics 268 are determined by applying one or more of the search query 216 and the clickstream data 238 to a first analytics model 272, according to one embodiment. The search sophistication score 270 is determined by applying the search sophistication characteristics 268 to a second analytics model 274, according to one embodiment.

The search sophistication characteristics 268 represent search characteristics of the users 212 that are transformed into a search sophistication score 270 by one or more analytics models, according to one embodiment. The search sophistication characteristics 268 are used to distinguish between less-sophisticated search queries and more-sophisticated search queries in order to identify the type of content search user experience to provide to the users 212, according to one embodiment. As an example, "can you help me find my tax refund amount from last year?" is an example of a search query that is formulated in a manner that is similar to communicating with another person. Because search queries that are formulated in a manner that is similar to communicating with another person include several terms that likely provide little improvement to the search, such a search query is generally considered to be a less sophisticated search query, according to one embodiment. In particular, pronouns (e.g., I, we, us, mine), question words (e.g., why, where, how), and punctuation are generally useless or less-useful terms for a search engine and are therefore used to characterize a user to determine which type of content search user experience would be more effective for the user, according to one embodiment. The search sophistication characteristics 268 are calculated for users who have used the financial management system 230, who have used the customer self-help system 250, or who have used both the financial management system 230 and the customer self-help system 250, according to one embodiment. The search sophistication characteristics 268 are determined by analyzing the search query 216 and the clickstream data 238, according to one embodiment. The search sophistication characteristics 268 are used to determine a level of search sophistication of a user and are used to identify which of the content search user experience options to provide to the user 214, according to one embodiment. The search sophistication characteristics 268 include, but are not limited to, one or more of pronoun use in the search query 216, punctuation in the search query 216, a character length of the search query 216, a number of search query terms in the search query 216, a user's typing speed in the financial management system 230, a user's typing speed and the customer self-help system 250, a user's typing speed while formulating the search query 216, a number of misspelled words in the search query 216, whether misspelled search query terms are adjacent key misspellings, whether misspelled search query terms are wrong letter order misspellings, whether misspelled search query terms are phonetical misspellings, misspellings made from a mobile device auto-correction, other misspelling characteristics, and any other search sophistication characteristics discussed herein, as known in the art at the time of filing, or as developed after the time of filing, according to various embodiments. In one embodiment, the search sophistication characteristics 268 include a mouse click rate as an indication of sophistication, since longer search queries (e.g., conversational queries) typically receive less clicks from users.

The customer self-help system 250 determines the search sophistication characteristics 268 by applying one or more of the search query 216 and the clickstream data 238 to the first analytics model 272, according to one embodiment. The first analytics model 272 analyzes the one or more of the search query 216 and the clickstream data 238 with one or more linguistics analysis algorithms to determine the search sophistication characteristics 268, according to one embodiment. The first analytics model 272 includes a probabilistic topic model to determine at least some of the search sophistication characteristics 268, according to one embodiment. The probabilistic topic model of the first analytics model 272 is implemented using one or more of a Latent Dirichlet Allocation ("LDA") algorithm, Latent Semantic Indexing ("LSI"), query clustering, query de-duplication, and one or more other techniques currently known or later developed for generating probabilistic topic models, according to various embodiments. The first analytics model 272 incorporates one or more third-party spell-checking engines for determining misspelling characteristics of the search query 216 and the clickstream data 238, according to one embodiment. The first analytics model 272 derives the typing speed from the clickstream data 238 and the search query 216 by comparing timestamps against the information entered for the search query 216 and the clickstream data 238, according to one embodiment. The first analytics model 272 employs one or more techniques to identify pronoun use, interrogatory term use, punctuation, query length characteristics, and other characteristics of the search query 216, according to one embodiment. Specific illustrative examples of techniques that are available for identifying the characteristics of the search query 216 include, but are not limited to, one or more open source language processing techniques (e.g. Python's Natural Language Toolkit ("NLTK"), Stanford CoreNLP Suite, Apache SOLR™ and Lucene™, etc.), commercial language processing techniques, and other language processing techniques whether known at the time of filing or as developed after the time of filing, according to various embodiments.

The search sophistication score 270 is a score that represents the likelihood that a user has an advanced skill or comfort with formulating search queries, according to one embodiment. The search sophistication score 270 is output from the second analytics model 274, and is a result of an analysis of the search sophistication characteristics 268, according to one embodiment. The search sophistication score 270 is defined within a range of scores that correspond to a level of search sophistication for the users 212, according to one embodiment. The higher the search sophistication score is for a user, the more likely the user is to be satisfied with an advanced content search user experience, according to one embodiment. The lower the search sophistication score is for a user, the more likely the user is to be satisfied with simplified content search user experience, according to one embodiment. A specific illustrative example of a range of search sophistication scores is 0-1 (inclusive of 0 and 1), although other ranges can also be used, according to one embodiment.

The customer self-help system 250 uses the second analytics model 274 to determine the search sophistication score 270, based on the search sophistication characteristics 268, according to one embodiment. In one embodiment, the second analytics model 274 includes or uses a predictive model to determine the search sophistication score 270. The predictive model receives the search sophistication characteristics 268 for one particular user (e.g., the user 214) and determines a search sophistication score for the particular user that is based on the search sophistication characteristics and actions of other prior users of the customer self-help system 250, according to one embodiment.

The predictive model of the second analytics model 274 is trained using predictive model training operations that include, but are not limited to, one or more of regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

The predictive model of the second analytics model 274 is trained using historic data (not shown) from prior users of the customer self-help system 250 as a training data set, according to one embodiment. The historic data from prior users of the customer self-help system 250 includes information that is indicative of users' actions after receiving one of the content search user experience options 258, according to one embodiment. The users' actions are used to determine whether the presentation of a particular content search user experience (e.g., basic, intermediate, advanced, etc.) enabled the user to effectively find portions of the customer support content 252 that were searched for, according to one embodiment. The users' actions include whether or not a user requested live customer support after receiving one of the content search user experience options 258. The users' actions include whether or not the user indicated satisfaction with one of the content search user experience options 258, according to one embodiment. The users' actions include whether or not the user returned to the use of the financial management system 230 after submitting a search query with one of the content search user experience options 258, according to one embodiment. The users' actions include the number of additional search queries the user submitted with one of the content search user experience options 258, before finding a satisfactory answer, according to one embodiment. The users' actions include whether a user searched for certain content and did not contact assisted support afterwards, and vice versa, according to one embodiment. Each of these user actions and the submitted search queries are associated with search sophistication characteristics for these prior users, and the users' actions in combination with the search sophistication characteristics for the prior users is used to train the predictive model of the second analytics model 274, according to one embodiment.

In one embodiment, the first analytics model 272 and the second analytics model 274 are the same analytics model. In one embodiment, the first analytics model 272 and the second analytics model 274 are both included in a third analytics model (not shown), which is used by the customer self-help system 250 to determine the search sophistication characteristics 268 and the search sophistication score 270.

The customer self-help system 250 applies the search sophistication score 270 to a threshold 276 to determine a level of search sophistication 278 for the user 214, according to one embodiment. The threshold 276 is a number that is within the range for the search sophistication score 270, according to one embodiment. One specific illustrative example of the threshold 276 is 0.7 if the potential range of the search sophistication score 270 is 0-1. If the search sophistication score 270 is greater than or equal to 0.7, then the level of search sophistication 278 is advanced, according to one embodiment. If the search sophistication score 270 is less than 0.7, then the level of search sophistication 278 is basic or less-experienced, according to one embodiment. The level of search sophistication 278 is a class label for the user and that is used for training the second analytics model 274, according to one embodiment. The level of search sophistication 278 is expressed as a as a binary variable (e.g., less-sophisticated and sophisticated), according to one embodiment. The level of search sophistication 278 is expressed as a as an integer, float, or categorical variable (e.g., basic, intermediate, advanced), according to one embodiment.

The customer self-help system 250 selects from the content search user experience options 258, based on the level of search sophistication 278, to determine or populate the personalized content search user experience 260, according to one embodiment. The content search user experience options 258 include a first content search user experience 280 and a second content search user experience 282, according to one embodiment. Although two content search user experience options 258 are specifically discussed herein, many more content search user experience options 258 are optionally available, according to one embodiment. The first content search user experience 280 is associated with a first or simplified content search user experience, which may include a single search text box, according to one embodiment. The first content search user experience 280 is associated with a basic or less-experienced level of search sophistication 278, according to one embodiment. Thus, if a user 214 is categorized as having a basic or less-experienced level of search sophistication 278, the customer self-help system 250 assigns the first content search user experience 280 for the personalized content search user experience 260 for delivery to the user 214, according to one embodiment.

The second content search user experience 282 is associated with a second or advanced content search user experience, according to one embodiment. The second content search user experience 282 is associated with an advanced level of search sophistication 278, according to one embodiment. Thus, if the user 214 is categorized as having an advanced level of search sophistication 278, the customer self-help system 250 assigns the second content search user experience 282 for the personalized content search user experience 260 for delivery to the user 214, according to one embodiment.

The customer self-help system 250 is represented by or implemented using data that is partially or wholly stored in memory 284 (inclusive of non-volatile memory and volatile memory) and is partially or wholly executed by processors 286, according to one embodiment.

Although the features and functionality of the production environment 200 are illustrated or described in terms of individual or modularized components, engines, modules, models, databases/data stores, and systems, one or more of the functions of one or more of the components, engines, modules, models, databases/data stores, or systems are functionally combinable with one or more other described or illustrated components, engines, modules, models, databases/data stores, and systems, according to one embodiment. Each of the described engines, modules, models, databases/data stores, characteristics, user experiences, content, and systems are data that can be stored in memory and executed by one or more processors, according to various embodiments.

Process

Figure 3:
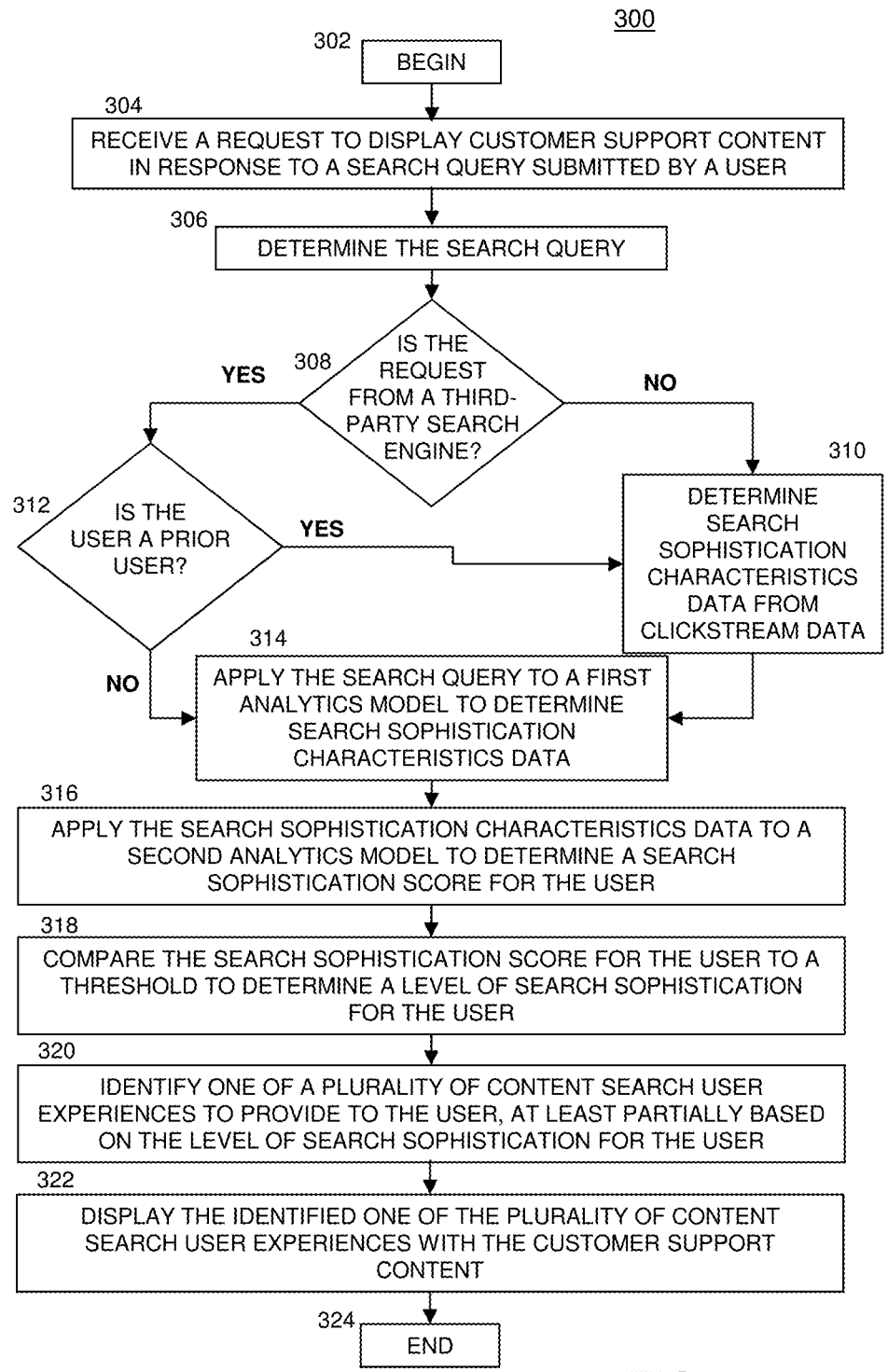
FIG. 3 is a flow diagram of a process for determining levels of search sophistication for users of a customer self-help system to personalize a content search user experience for the users, in accordance with one embodiment.

FIG. 3 is an example flow diagram of a process 300 for determining levels of search sophistication for users of a customer self-help system to personalize a content search user experience for the users and to increase a likelihood of user satisfaction with the search experience, according to one embodiment. The process 300 is one example of a process or algorithm that can be used in the production environment 200 (shown in FIG. 2) to select between the first content search user experience 280 (shown in FIG. 2) and the second content search user experience 282 (shown in FIG. 2), according to one embodiment. A specific illustrative example of the first content search user experience 280 (shown in FIG. 2) includes the first or simplified content search user experience 104 (shown in FIG. 1A), according to one embodiment. A specific illustrative example of the second content search user experience 282 (shown in FIG. 2) includes the second or advanced content search user experience 152 (shown in FIG. 1B), according to one embodiment.

Returning to FIG. 3, at operation 302, the process 300 begins, according to one embodiment. Operation 302 proceeds to operation 304, according to one embodiment.

At operation 304, the process 300 receives a request to display customer support content in response to a search query submitted by a user, according to one embodiment. The request to display customer support content is a request made by a web browser in response to selection of a hyperlink that references customer support content within a customer self-help system, according to one embodiment. The user submits the search query in to a third-party search engine, according to one embodiment. The user submits the search query directly to a customer self-help system, according to one embodiment. Operation 304 proceeds to operation 306, according to one embodiment.

At operation 306, the process 300 determines the search query, according to one embodiment. The search query is determined by parsing search query terms from a URL of the web page from which a user was directed to a customer self-help system, according to one embodiment. Operation 306 proceeds to operation 308, according to one embodiment.

At operation 308, the process 300 determines if the request is from a third-party search engine, according to one embodiment. If the request is not from a third-party search engine, the operation 308 proceeds to operation 310, according to one embodiment. If the request is from a third-party search engine, the operation 308 proceeds to operation 312, according to one embodiment.

At operation 310, the process 300 determines search sophistication characteristics data from clickstream data, according to one embodiment. The clickstream data is acquired from use of a customer self-help system or from use of a financial management system that the customer self-help system is associated with, according to one embodiment. Operation 310 proceeds to operation 314, according to one embodiment.

At operation 312, the process 300 determines if the user is a prior user, according to one embodiment. By calculating a user identification ("ID") from characteristics of a user's computing system, a customer self-help system determines if a user has previously accessed a financial management system supported by the customer self-help system or accessed the self-help system, according to one embodiment. If the user is a prior user, operation 312 proceeds to operation 310, according to one embodiment. If the user is not a prior user, operation 312 proceeds to operation 314, according to one embodiment.

At operation 314, the process 300 applies the search query to a first analytics model to determine search sophistication characteristics data, according to one embodiment. Operation 314 proceeds to operation 316, according to one embodiment.

At operation 316, the process 300 applies the search sophistication characteristics data to a second analytics model to determine a search sophistication score for the user, according to one embodiment. In one embodiment, the first analytics model and the second analytics model are a single analytics model or are included in a third analytics model. Operation 316 proceeds to operation 318, according to one embodiment.

At operation 318, the process 300 compares the search sophistication score for the user to a threshold to determine a level of search sophistication for the user, according to one embodiment. Operation 318 proceeds to operation 320, according to one embodiment.

At operation 320, the process 300 identifies one of a plurality of content search user experiences to provide to the user, at least partially based on the level of search sophistication for the user, according to one embodiment. Operation 320 proceeds to operation 322, according to one embodiment.

At operation 322, the process 300 displays the identified one of the plurality of content search user experiences concurrently with customer support content, according to one embodiment. Operation 322 proceeds to operation 324, according to one embodiment.

At operation 324, the process 300 ends, according to one embodiment.

Figure 4A:
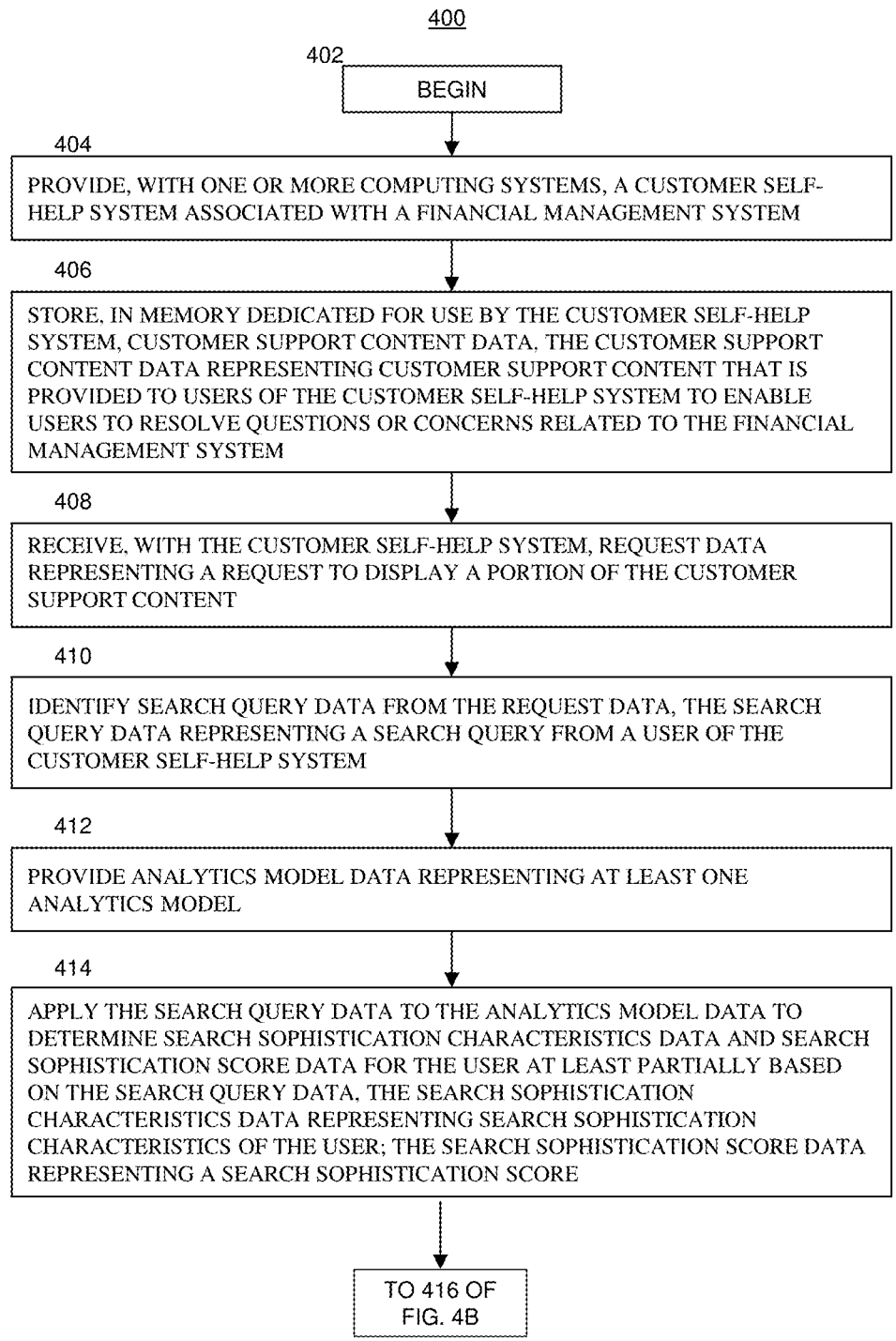
FIGS. 4A and 4B are a flow diagram of a process for determining levels of search sophistication for users of a customer self-help system to personalize a content search user experience for the users, in accordance with one embodiment.
Figure 4B:
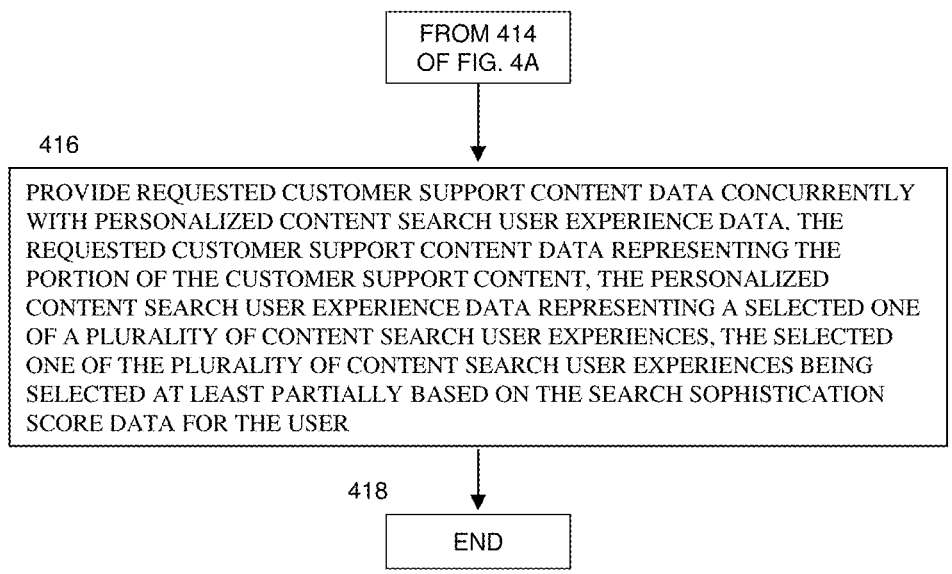

FIGS. 4A and 4B together are an example flow diagram of a process 400 for determining levels of search sophistication for users of a customer self-help system to personalize a content search user experience for the users and to increase a likelihood of user satisfaction with the search experience, according to one embodiment.

At operation 402, the process 400 begins, according to one embodiment. Operation 402 proceeds to operation 404, according to one embodiment.

At operation 404, the process 400 provides, with one or more computing systems, a customer self-help system associated with a financial management system, according to one embodiment. Operation 404 proceeds to operation 406, according to one embodiment.

At operation 406, the process 400 stores, in memory dedicated for use by the customer self-help system, customer support content data, the customer support content data representing customer support content that is provided to users of the customer self-help system to enable users to resolve questions or concerns related to the financial management system, according to one embodiment. Operation 406 proceeds to operation 408, according to one embodiment.

At operation 408, the process 400 receives, with the customer self-help system, request data representing a request to display a portion of the customer support content, according to one embodiment. Operation 408 proceeds to operation 410, according to one embodiment.

At operation 410, the process 400 identifies search query data from the request data, the search query data representing a search query from a user of the customer self-help system, according to one embodiment. Operation 410 proceeds to operation 412, according to one embodiment.

At operation 412, the process 400 provides analytics model data representing at least one analytics model, according to one embodiment. Operation 412 proceeds to operation 414, according to one embodiment.

At operation 414, the process 400 applies the search query data to the analytics model data to determine search sophistication characteristics data and search sophistication score data for the user at least partially based on the search query data, the search sophistication characteristics data representing search sophistication characteristics of the user; the search sophistication score data representing a search sophistication score, according to one embodiment. Operation 414 proceeds to operation 416 and FIG. 4B, according to one embodiment.

At operation 416, the process 400 provides requested customer support content data concurrently with personalized content search user experience data, the requested customer support content data representing the portion of the customer support content, the personalized content search user experience data representing a selected one of a plurality of content search user experiences, the selected one of the plurality of content search user experiences being selected at least partially based on the search sophistication score data for the user, according to one embodiment. Operation 416 proceeds to operation 418, according to one embodiment.

At operation 418, the process 400 ends, according to one embodiment.

As noted above, the specific examples discussed above are but illustrative examples of implementations of embodiments of the method or process for determining levels of search sophistication for users of a customer self-help system to personalize a content search user experience for the users and to increase a likelihood of user satisfaction with the search experience. Those of skill in the art will readily recognize that other implementations and embodiments are possible. Therefore, the discussion above should not be construed as a limitation on the claims provided below.

Determining levels of search sophistication for users of a customer self-help system to personalize a content search user experience for the users and to increase a likelihood of user satisfaction with the search experience, is a technical solution to a long standing technical problem of content search user experience dissatisfaction and inefficient searching in customer self-help systems. Therefore, the disclosed embodiments do not represent an abstract idea for at least a few reasons. First, determining levels of search sophistication for users to personalize a content search user experience for the users is not an abstract idea because it is not merely an idea itself (e.g., cannot be performed mentally or using pen and paper). Indeed, some of the disclosed embodiments of determining levels of search sophistication include tracking clickstream data and using analytics models to determine search sophistication score data, which cannot be performed mentally. Second, determining levels of search sophistication for users of a customer self-help system to personalize a content search user experience for the users is not an abstract idea because it is not a fundamental economic practice (e.g., is not merely creating a contractual relationship, hedging, mitigating a settlement risk, etc.). Third, determining levels of search sophistication for users of a customer self-help system to personalize a content search user experience for the users is not an abstract idea because it is not a method of organizing human activity (e.g., managing a game of bingo). Rather, the disclosed embodiments analyze human behavior to determine characteristics of users that can be used to modify computing processes (e.g., the selection of one content search user experience over another). Fourth, although mathematics may be used to generate an analytics model, determining levels of search sophistication for users of a customer self-help system to personalize a content search user experience for the users is not simply a mathematical relationship/formula but is instead a technique for transforming search query data into data that is used to personalize a content search user experience for users, to increase a likelihood of causing users to more quickly or efficiently find answers to questions, without the use of live customer support, according to one embodiment.

Further, determining levels of search sophistication for users of a customer self-help system to personalize a content search user experience for the users is not an abstract idea because the disclosed techniques allow for significant improvement to the technical fields of user experience, self-help systems, customer service, and financial management systems, according to one embodiment. The present disclosure adds significantly to the field of content searching because the disclosed customer self-help system reduces the likelihood of redundant searches, reduces the likelihood of users seeking live customer support, and increases the likelihood of improving users' search experiences by providing one of a number of content search user experiences that is suited to the searching skills of the users, according to one embodiment.

As a result, embodiments of the present disclosure allow for reduced use of processor cycles, processor power, communications bandwidth, memory, and power consumption, by reducing the number of search queries submitted by users when searching for customer support content, according to one embodiment. Consequently, computing and communication systems implementing or providing the embodiments of the present disclosure are transformed into more operationally efficient devices and systems.

In addition to improving overall computing performance, personalizing a content search user experience for the users of a customer self-help system significantly improves the field of financial management systems, by increasing the likelihood that users will promptly resolve their own concerns that arise during the use of the financial management system, so that the users continue use of the financial management system that is supported by the customer self-help system, according to one embodiment. Furthermore, by personalizing a content search user experience for the users, the disclosed embodiments help maintain or build trust and therefore loyalty in the customer self-help system and in the financial management system with which it is associated, which results in repeat customers, efficient delivery of financial services, and reduced abandonment of use of the financial management system, according to one embodiment.

In accordance with an embodiment, a computing system implemented method determines levels of search sophistication for users of a customer self-help system to personalize a content search user experience for the users. The method includes providing, with one or more computing systems, a customer self-help system associated with a financial management system, according to one embodiment. The method includes storing, in memory dedicated for use by the customer self-help system, customer support content data, the customer support content data representing customer support content that is provided to users of the customer self-help system to enable users to resolve questions or concerns related to the financial management system, according to one embodiment. The method includes receiving, with the customer self-help system, request data representing a request to display a portion of the customer support content, according to one embodiment. The method includes identifying search query data from the request data, the search query data representing a search query from a user of the customer self-help system, according to one embodiment. The method includes providing analytics model data representing at least one analytics model, according to one embodiment. The method includes applying the search query data to the analytics model data to determine search sophistication characteristics data and search sophistication score data for the user at least partially based on the search query data, the search sophistication characteristics data representing search sophistication characteristics of the user; the search sophistication score data representing a search sophistication score, according to one embodiment. The method includes providing requested customer support content data concurrently with personalized content search user experience data, the requested customer support content data representing the portion of the customer support content and the personalized content search user experience data representing a selected one of a plurality of content search user experiences, the selected one of the plurality of content search user experiences being selected at least partially based on the search sophistication score data for the user, according to one embodiment.

In accordance with an embodiment, a system determines levels of search sophistication for users of a customer self-help system to personalize a content search user experience for the users. The system includes one or more processors, according to one embodiment. The system includes memory having data representing instructions which, if executed by the one or more processors, cause the one or more processors to perform a process for determining levels of search sophistication for users of a customer self-help system to personalize a content search user experience for the users, according to one embodiment. The process includes providing a customer self-help system associated with a financial management system, according to one embodiment. The process includes storing, in memory dedicated for use by the customer self-help system, customer support content data, the customer support content data representing customer support content that is provided to users of the customer self-help system to enable users to resolve questions or concerns related to the financial management system, according to one embodiment. The process includes receiving, with the customer self-help system, request data representing a request to display a portion of the customer support content, according to one embodiment. The process includes identifying search query data from the request data, the search query data representing a search query from a user of the customer self-help system, according to one embodiment. The process includes providing analytics model data representing at least one analytics model, according to one embodiment. The process includes applying the search query data to the analytics model data to determine search sophistication characteristics data and search sophistication score data for the user at least partially based on the search query data, the search sophistication characteristics data representing search sophistication characteristics of the user; the search sophistication score data representing a search sophistication score, according to one embodiment. The process includes providing requested customer support content data concurrently with personalized content search user experience data, the requested customer support content data representing the portion of the customer support content and the personalized content search user experience data representing a selected one of a plurality of content search user experiences, the selected one of the plurality of content search user experiences being selected at least partially based on the search sophistication score data for the user, according to one embodiment.

In accordance with an embodiment, a system for determines levels of search sophistication for users of a customer self-help system to personalize a content search user experience for the users. The system includes a memory that stores customer self-help system data and customer support content data, the customer self-help system data representing a customer self-help system and the customer support content data representing customer support content for the customer self-help system, the customer self-help system being associated with and configured to support a financial management system represented by financial management system data, according to one embodiment. The system includes one or more processors communicatively coupled to the memory to execute the customer self-help system data to operate the customer self-help system, according to one embodiment. The system includes user experience page data representing a user experience page that is provided, by the customer self-help system, to a user of the customer self-help system in response to search query data submitted by the user, the search query data representing a search query, the user experience page data including requested customer support content data representing requested portions of the customer support content, the user experience page data including personalized content search user experience data representing a personalized content search user experience, according to one embodiment. The system includes user profile data for the user, the user profile data including search sophistication characteristics data representing search sophistication characteristics of the user and search sophistication score data, according to one embodiment. The system includes analytics model data representing an analytics model that determines the personalized content search user experience data at least partially based on applying the search query data to the analytics model data, by the customer self-help system, according to one embodiment.

In the discussion above, certain aspects of one embodiment include process steps or operations or instructions described herein for illustrative purposes in a particular order or grouping. However, the particular order or grouping shown and discussed herein are illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein do not limit the scope of the invention as claimed below.

As discussed in more detail above, using the above embodiments, with little or no modification or input, there is considerable flexibility, adaptability, and opportunity for customization to meet the specific needs of various users under numerous circumstances.

In the discussion above, certain aspects of one embodiment include process steps or operations or instructions described herein for illustrative purposes in a particular order or grouping. However, the particular order or grouping shown and discussed herein are illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a system, the method comprising:
   providing a system user with access to customer support content;
   receiving a request from the system user to display a particular portion of the customer support content;
   generating a search sophistication value for the system user based on an analysis of the system user's request;
   selecting one of a plurality of search experience options for the system user based on the system user's search sophistication value; and
   presenting the system user with the particular portion of the customer support content via the selected search experience option.

2. The method of claim 1, further comprising:
   generating a set of user data for the system user based at least in part on the system user's request; and personalizing the selected search experience option for the system user based on the generated set of user data.

3. The method of claim 1, wherein the system is for financial management.

4. The method of claim 1, wherein the system is at least one of a tax return preparation system, a business financial management system, or a personal financial management system.

5. The method of claim 1, wherein the system user's request is received from a third-party search engine.

6. The method of claim 5, wherein the system user's request is embedded in a Uniform Resource Locator ("URL") associated with the third-party search engine.

7. The method of claim 1, wherein the analysis of the system user's request includes analyzing at least one of a set of pronouns within the system user's request, punctuation within the system user's request, a character count of the system user's request, a number of search terms within the system user's request, or one or more misspellings within the system user's request.

8. The method of claim 1, wherein the analysis of the system user's request includes analyzing at least one of adjacent key misspellings within the system user's request, incorrect letter ordering within the system user's request, phonetical misspelling within the system user's request, or one or more mobile device autocorrections within the system user's request.

9. The method of claim 1,
wherein the selected search experience option is an advanced search experience option if the system user's search sophistication value exceeds a first value.

10. The method of claim 1, wherein the selected search experience option is a simple search experience option if the system user's search sophistication value is below a first value.

11. The method of claim 1, wherein the selecting is further based on a set of
clickstream data associated with the system user.

12. The method of claim 1, wherein the analysis of the system user's request includes a consideration of at least one of a probabilistic topic model, a spell-checking engine, or a character search algorithm.

13. The method of claim 12, wherein the probabilistic topic model includes at least one of a Latent Dirichlet Allocation algorithm, a Latent Semantic Indexing ("LSI") algorithm, a query clustering algorithm, or a query de-duplication algorithm.

14. The method of claim 1, wherein the customer support content includes at least one of crowd-sourced content, service provider content, one or more acronyms, or one or more definitions.

15. The method of claim 1, wherein the analysis of the system user's request includes using a predictive model and at least one of a regression, a decision tree, an artificial neural network, a support vector machine, a nearest neighbor method, a distance-based method, naive Bayes, a linear discriminant analysis, or a k-nearest neighbor algorithm.

16. A system comprising:
one or more processors; and
at least one memory coupled to the one or more processors and storing instructions that, when executed by one or more processors, cause the system to perform operations comprising:
providing a system user with access to customer support content;
receiving a request from the system user to display a particular portion of the customer support content;
generating a search sophistication value for the system user based on an analysis of the system user's request;
selecting one of a plurality of search experience options for the system user based on the system user's search sophistication value;
and
presenting the system user with the particular portion of the customer support content via the selected search experience option.

17. The system of claim 16, wherein the analysis of the system user's request includes analyzing at least one of a set of pronouns within the system user's request, punctuation within the system user's request, a character count of the system user's request, a number of search terms within the system user's request, or one or more misspellings within the system user's request.

18. The system of claim 16, wherein the analysis of the system user's request includes analyzing at least one of adjacent key misspellings within the system user's request, incorrect letter ordering within the system user's request, phonetical misspelling within the system user's request, or one or more mobile device autocorrections within the system user's request.

19. The system of claim 16, wherein the selected search experience option is an advanced search experience option if the system user's search sophistication value exceeds a first value.

20. The system of claim 16, wherein the selected search experience option is a simple search experience option if the system user's search sophistication value is below a first value.

21. The system of claim 16, wherein the selecting is further based on a set of clickstream data associated with the system user.

22. The system of claim 16, wherein the analysis of the system user's request includes a consideration of at least one of a probabilistic topic model, a spell-checking engine, or a character search algorithm.

23. The system of claim 16, wherein the analysis of the system user's request includes using a predictive model and at least one of a regression, a decision tree, an artificial neural network, a support vector machine, a nearest neighbor method, a distance-based method, naive Bayes, a linear discriminant analysis, or a k-nearest neighbor algorithm.

24. A non-transitory computer-readable medium storing instructions that, when executed by one or more processors of a system, causes the system to perform operations, comprising:
providing a system user with access to customer support content;
receiving a request from the system user to display a particular portion of the customer support content;
generating a search sophistication value for the system user based on an analysis of the system user's request;
selecting one of a plurality of search experience options for the system user based on the system user's search sophistication value; and
presenting the system user with the particular portion of the customer support content via the selected search experience option.

25. The computer-readable medium of claim 24, wherein the system user's request is received from a third-party search engine.

26. The computer-readable medium of claim 25, wherein the system user's request is embedded in a Uniform Resource Locator ("URL") associated with the third-party search engine.

27. The computer-readable medium of claim 24, wherein the analysis of the system user's request includes a consideration of at least one of a probabilistic topic model, a spell-checking engine, or a character search algorithm.

28. The computer-readable medium of claim 24, wherein execution of the instructions causes the system to perform operations further comprising:
generating a set of user data for the system user based at least in part on the system user's request; and
personalizing the selected search experience option for the system user based on the generated set of user data.

29. The computer-readable medium of claim 28, wherein the selected search experience option is an advanced search experience option if the system user's search sophistication value exceeds a first value.

30. The computer-readable medium of claim 29, wherein the selected search experience option is a simple search experience option if the system user's search sophistication value is below a first value.

\* \* \* \* \*